(12) United States Patent
Lalonde et al.

(10) Patent No.: US 11,726,755 B2
(45) Date of Patent: Aug. 15, 2023

(54) CACHING OF COMPILED SHADER PROGRAMS IN A CLOUD COMPUTING ENVIRONMENT

(71) Applicant: NVIDIA Corporation, Santa Clara, CA (US)

(72) Inventors: Paul Albert Lalonde, Victoria (CA); Franck Diard, Roquefort les pins (FR); Patrick James Neill, Sherwood, OR (US); Michael Oxford, San Jose, CA (US); Todd Michael Poynter, Georgetown, TX (US)

(73) Assignee: Nvidia Corporation, Santa Clara, CA (US)

( * ) Notice: Subject to any disclaimer, the term of this patent is extended or adjusted under 35 U.S.C. 154(b) by 4 days.

(21) Appl. No.: 17/226,568

(22) Filed: Apr. 9, 2021

(65) Prior Publication Data

US 2022/0326920 A1    Oct. 13, 2022

(51) Int. Cl.
| | | |
|---|---|---|
| *G06F 8/41* | (2018.01) | |
| *H04L 67/1095* | (2022.01) | |
| *H04L 67/00* | (2022.01) | |
| *G06T 1/20* | (2006.01) | |
| *G06F 8/60* | (2018.01) | |
| *G06F 8/71* | (2018.01) | |
| *G06F 16/22* | (2019.01) | |
| *G06T 1/60* | (2006.01) | |
| *H04L 67/568* | (2022.01) | |
| *G06N 20/00* | (2019.01) | |

(52) U.S. Cl.
CPC .............. *G06F 8/44* (2013.01); *G06F 8/60* (2013.01); *G06F 8/71* (2013.01); *G06F 16/2255* (2019.01); *G06T 1/20* (2013.01); *G06T 1/60* (2013.01); *H04L 67/1095* (2013.01); *H04L 67/34* (2013.01); *H04L 67/568* (2022.05); *G06N 20/00* (2019.01)

(58) Field of Classification Search
CPC .......... G06F 8/44; G06F 16/2255; G06F 8/60; G06F 8/71; G06T 1/20; G06T 1/60; H04L 67/1095; H04L 67/2842; H04L 67/34; G06N 20/00
USPC ........................................................ 717/140
See application file for complete search history.

(56) References Cited

U.S. PATENT DOCUMENTS

| | | | |
|---|---|---|---|
| 10,423,463 B1 * | 9/2019 | Wilt | G06F 9/5027 |
| 2016/0307364 A1 * | 10/2016 | Fabius | G06T 1/20 |
| 2019/0232164 A1 * | 8/2019 | Griffais | G06F 8/41 |
| 2019/0308099 A1 * | 10/2019 | Lalonde | G06F 12/0811 |
| 2020/0167985 A1 * | 5/2020 | Brennan | G06T 1/60 |
| 2021/0065441 A1 * | 3/2021 | Colbert | G06T 15/005 |

FOREIGN PATENT DOCUMENTS

CN        107426286 A  * 12/2017  ............ H04W 4/021

OTHER PUBLICATIONS

Sitthi-amorn et al, "An Improved Shading Cache for Modern GPUs", 2008, [Online], pp. 95-101, [Retrieved from internet on Feb. 24, 2023], <https://diglib.eg.org/bitstream/handle/10.2312/EGGH.EGGH08.095-101/095-101.pdf?sequence=1&isAllowed=y> (Year: 2008).*

* cited by examiner

*Primary Examiner* — S. Sough
*Assistant Examiner* — Zengpu Wei
(74) *Attorney, Agent, or Firm* — Lowenstein Sandler LLP

(57) ABSTRACT

Apparatuses, systems, and techniques for caching of compiled shader programs in a cloud computing environment.

22 Claims, 19 Drawing Sheets

| SHADER KEY 404 | SHADER VALUE 406 | MEMORY ADDRESS 408 | NODE 410 | SHADER SET 412 |
|---|---|---|---|---|
| 916K3D | 3S09V2S3N3 | 0x10010000 | 152A | 1 |
| 8N3020 | 74FSW238FN | 0x10010010 | 152B | 1 |
| 4DN29D | KLHF4C3H90 | 0x10010018 | 152A | 2 |

FIG. 4

| SHADER KEY 504 | SHADER VALUE 506 | CLIENT DEVICE IDs 508 | TEMPORARY BUFFER MEMORY ADDRESS 510 | VALIDATION COUNTER 512 |
|---|---|---|---|---|
| 3DS02F | 3DDG538WD | 1001, 1580,...2671 | 0x00000142 | 14 |
| FD93X3 | ZDG26SF29 | 1008, 1001,...6894 | 0x00000144 | 9 |
| 66HY32 | 25FW5FN20 | 2010 | 0x00000146 | 1 |

FIG. 5

CACHING OF COMPILED SHADER PROGRAMS IN A CLOUD COMPUTING ENVIRONMENT

TECHNICAL FIELD

At least one embodiment pertains to processing resources used to perform and facilitate caching of compiled shader programs. For example, at least one embodiment pertains to processors or computing systems used to provide and enable a shader program to be compiled at one or more computing systems of a cloud computing environment and stored at a shader cache hosted by an application hosting platform, according to various novel techniques described herein.

BACKGROUND

Shader programs are programs executed by a processing device to render graphics for an application running at a computing system. A compiler of the computing system may compile a shader program and the processing device may execute the compiled shader program once the shader program is referenced by the application. An application may reference thousands or hundreds of thousands of distinct shader programs during application runtime, which each may take a significant amount of time to compile. Shader programs of an application may be compiled and stored at a cache at the computing system prior to the application runtime. However, existing techniques for shader program caching are computationally expensive and typically do not provide a significant performance benefit at the computing system. Additionally, existing shader program caching techniques usually cannot be implemented for applications hosted on a cloud computing environment in accordance with network and system performance constraints.

BRIEF DESCRIPTION OF DRAWINGS

Various embodiments in accordance with the present disclosure will be described with reference to the drawings, in which:

FIG. 4 depicts an example shader cache data structure, according to at least one embodiment;

FIG. 5 depicts an example temporary buffer data structure, according to at least one embodiment;

DETAILED DESCRIPTION

Figure 1A:
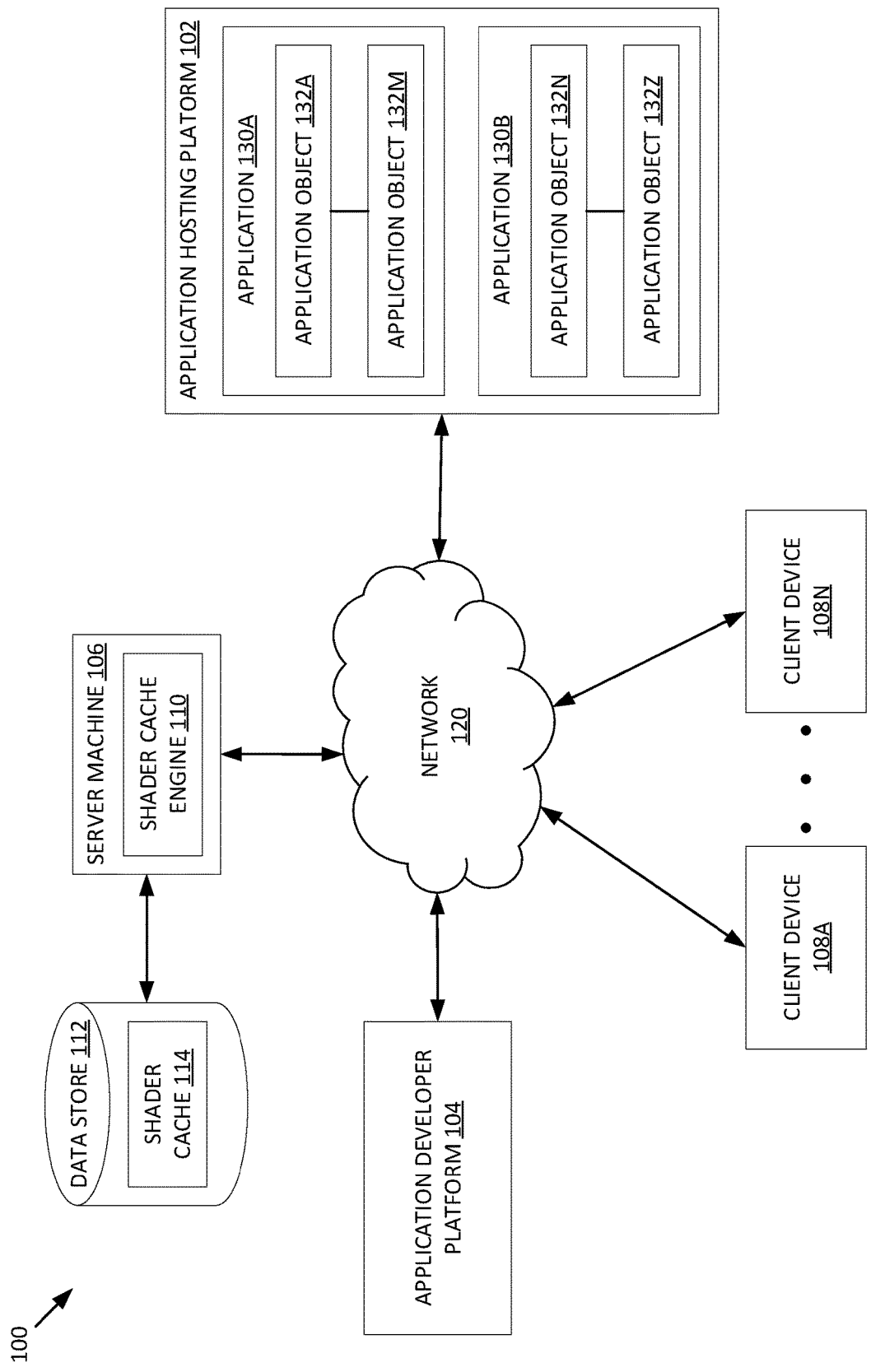
FIG. 1A is a block diagram of an example system architecture, according to at least one embodiment.

Shader programs are programs executed by a processing device (e.g., a graphics processing unit (GPU)) to render graphics of an application running at a computing system. Generally, a compiler may compile a shader program and the compiled shader program may be executed in response to the shader program being referenced by the application. The compiled shader program may be specific to the particular type of hardware (e.g., the processing device) supporting the application at the computing system, a type or version of a driver running on the system hardware, etc. Compiling a shader program may take a significant amount of time (e.g., several milliseconds or longer). Some applications may reference thousands or hundreds of thousands of distinct shader programs during application runtime. Accordingly, compiling each shader program referenced by an application may consume a significant amount of computing system resources and, in some instances, may cause delays in graphics rendering that is noticeable by a user of the computing system.

Some computing systems may maintain a shader cache that stores compiled versions of each shader program referenced by the application during the application runtime. For example, when an application is initialized at a computing system, each shader program that is referenced by the application may be loaded to the computing system, compiled, and stored at the shader cache before the runtime of the application. During the application runtime, the compiler would not need to re-compile a shader program referenced by the application, as the compiled shader program can be retrieved from the shader cache and executed by the processing device.

Although the shader cache prevents the compiler from compiling each shader program each time the shader program is referenced by the application, it is common for the application to reference many shader programs, which requires a significant amount of computing resources and may cause delays in graphics rendering. Additionally, due to storage constraints of a computing system, the size of a shader cache may not be sufficient to store each compiled shader program that could be referenced by the application. For example, shader programs that are compiled during an initial period of the application runtime may need to be removed from the shader cache to free up storage space for shader programs that are compiled during a subsequent period of the application runtime. However, the removed shader programs may be subsequently referenced by the application again and therefore the application may need to re-compile the referenced shader programs and re-store the compiled shader programs at the shader cache.

Some applications that reference shader programs are hosted on a cloud computing environment by an application hosting platform. A client device may be virtualized and have a virtual system running an instance of an application hosted by the cloud computing environment (e.g., as part of a virtual machine, a container, a process, etc.). While the instance of the application is initialized by the virtual system of the client device, each shader program that is referenced by the application instance may be loaded to a memory and compiled by a compiler. During the runtime of the application instance, a processing device for the virtual system may retrieve a compiled version of each shader program referenced by the application instance from the shader cache. After the application instance is terminated at the virtual system, the virtual system may be deconstructed at the client device and thus each compiled shader program at the shader cache may be removed from the memory. These operations may be repeated each time that an instance of the application is initialized by the virtualized system at the client device, even when the same client device subsequently executes an instance of the same application referencing the same shader programs.

The shader programs referenced and compiled for each instance of the application may be the same or substantially similar at each respective client device connected to the application hosting platform. As each shader program is compiled and stored at a shader cache located at each client device, each client device may consume a significant amount of computing and storage resources to maintain the shader cache at the respective client device, reducing overall system efficiency and increasing overall system latency. Additionally, a user of each client device running an instance of the application may experience graphics delays caused by shader program compilation at the respective client device, negatively impacting overall user experience for the application. Furthermore, as described above, each respective client device may have to generate and subsequently deconstruct a shader cache for each application instance runtime at the respective client device, which requires a significant amount of computing resources.

Embodiments of the present disclosure address the above and other deficiencies by enabling caching of shader programs in a cloud computing environment, in which an application hosting platform can be configured to enable generation and transmission of precompiled shader programs (e.g., stored at network disk storage) to each respective client device during the initialization of each application instance. A shader cache may be maintained by the application hosting platform and may store shader programs that are referenced by client devices' instances of a respective application hosted by the platform. Each client device may be associated with a distinct type of processing device, a distinct version of a driver, distinct state of processing pipeline, etc. An application instance running on a client device may reference a shader program and the client device may request, from the shader cache, the compiled version of the shader program that is compatible with the type of processing device, version of the device driver, etc. associated with the client device. The platform may transmit the compiled shader program to the client device for execution at the client device, if the compiled shader program is stored at the shader cache and, in some instances, if the platform can retrieve and transmit the compiled shader program in accordance with performance constraints (e.g., within 300 microseconds). In some embodiments, the platform may identify a set of compiled shader programs that the client device is likely to request in the future in addition to the initially requested shader program and transmit the set of compiled shader programs with the initially requested shader program to the client device. If the compiled shader program is not stored at the shader cache, the client device may need to compile the referenced shader program and transmit the compiled shader program to the platform for storage at the shader cache. After the platform validates the compiled shader program, the platform may store the compiled shader program at the shader cache for use by subsequent client devices having the same type of processing device and/or version of the device driver that are running instances of the application. The validated shader program may be provided to another client device running an instance of the application in response to a request for the compiled shader program, as described above.

The shader cache of the application hosting platform may be distributed over multiple nodes for an application hosting platform, in some embodiments. A node refers to a grouping of hardware resources, software resources, etc., within the cloud computing environment. Each node may host one or more portions of the shader cache and each node may service a request for a compiled shader program from client devices connected to the respective node. For example, a client device may transmit a request for a compiled shader program to a first node of the platform. If the requested compiled shader program is stored at the portion of the shader cache hosted at the first node, the first node may transmit the compiled shader program to the client device in response to the request. The platform may determine whether the requested compiled shader program is stored at the portion of the shader cache based on a hash of one or more keys for the client device, each key indicating a type of processing device associated with the client device and/or a version of a driver of the processing device. If the requested compiled shader program is not stored at the portion of the shader cache hosted at the first node, the first node may identify a second node that stores the compiled shader program (e.g., through a consistent hash protocol) and forward the request to the second node.

In some embodiments, the client device may request the compiled shader program and in addition it may initiate a compilation process locally to generate a compiled version of the shader program referenced by the application at the same or approximately the same time that the client device transmits the request for the compiled shader program to the platform (or a respective node of the platform). If the client device receives the compiled shader program from the platform before the compilation process at the client device is completed, the client device may terminate the compilation process and may execute the received compiled shader program, in accordance with the reference by the application instance. If the client device completes the compilation process before the requested compiled shader program is received, or if the client device receives a message from the platform indicating that the compiled shader program is not stored at the shader cache, the client device may execute the compiled version of the shader program generated locally.

Aspects and embodiments of the present disclosure enable efficient compilation of shader programs for client devices' instances of applications hosted by a cloud computing environment. Rather than having each client device that is running an instance of an application compiling each shader program referenced by the application instance, each client device may request the compiled version of the shader program from the shader cache, reducing the number of costly compilation processes running at the same clients device and across multiple client devices that use the same compiled version of the shader program. Accordingly, a user of the respective client device may experience a fewer number (e.g., zero) of graphics delays caused by shader program compilation at the client device, improving overall user experience for the application.

Additionally, embodiments of the present disclosure enable storing compiled shader programs of an application in a shader cache of the application hosting platform and not at a shader cache at memory of a respective client device. Accordingly, for virtualized client devices, the compiled shader programs are maintained at the shader cache after a virtual system is deconstructed at a respective client device (e.g., after the application instance is terminated at the client device) and are not re-compiled after the respective client device initializes another instance of the application in a virtual system. This also reduces the number of compilation processes that are performed at each respective client device, and across multiple client devices of the overall system. By reducing the number of compilation processes performed for the overall system, a significant number of resources are available for other processes at the cloud computing environment, decreasing an overall system latency and increasing an overall system efficiency.

System Architecture

FIG. 1A is a block diagram of an example system architecture 100, according to at least one embodiment. The system architecture 100 (also referred to as "system" herein) includes application hosting platform 102, application developer platform 104, server machine 106, client devices 108A-N (collectively and individually referred to as client device(s) 108), and data store 112, each connected to a network 120. In implementations, network 120 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 112 is a persistent storage that is capable of storing content items as well as data structures to tag, organize, and index the content items. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by platform 102 or one or more different machines coupled to the platform 102 via network 120.

Application hosting platform 102 may be configured to host one or more applications (e.g., application 130A, application 130B, etc.) provided by an application developer (i.e., via application developer platform 104). Application developer platform 104 may be used by an application developer (e.g., a user, company, organization, etc.). For example, an application developer may be a video game developer that develops an video game (represented by an application 130) for users to interact with on client devices 108. Application hosting platform 102 may provide users with access to an application 130 (or an instance of an application 130) developed by application developer platform 104 via a respective client device 108A-N. For example, application hosting platform 102 may allow users to consume, upload, download, and/or search for applications 130. In some embodiments, application hosting platform 102 may include a website (e.g., one or more webpages) that may be used to provide users with access to applications 130. In other or similar embodiments, client devices 108 may be virtualized and have a virtual system running an instance of application 130 (e.g., as part of a virtual machine, a container, a process, etc.). It should be noted that although some embodiments of the present disclosure are described with respect to an instance of application 130 running on a virtualized client device 108, embodiments of the present disclosure may also be applied to applications 130 running on a client device 108 that is not virtualized. Similarly, embodiments of the present disclosure that are directed to an application 130 running on a client device 108 that is not virtualized may also be applicable for an instance of application 130 running on a virtualized client device 108.

In some embodiments, each application 130 may consist of one or more application objects (e.g., application objects 132-N of application 130A, application objects 132N-132Z of application 130B, etc.). Application hosting platform 102 may render each application object 132 for display via a user interface (UI) at each client device running an instance of a respective application. Each application object 132 may be provided for application 130 by an application developer via application developer platform 104. A user of the respective client device 108 may interact with the instance of the application by engaging with a rendered application object 132 via the client device UI. In an illustrative example, applications 130A and 130B may be video game applications developed by a video game developer. Application objects 132 may be components of a respective video game application (e.g., a gaming object, a gaming map, etc.) that is rendered for display at a UI of a client device running the instance of the respective video game application. A user of a respective client device 108 may engage with (e.g., consume, interact, etc.) the rendered application object 132 in order to progress through the video game via the respective client device 108. Further details regarding rendering each application object 132 are provided below.

The client devices 108 may include devices, including but not limited to: televisions, smart phones, cellular telephones, personal digital assistants (PDAs), portable media players, netbooks, laptop computers, electronic book readers, tablet computers, desktop computers, set-top boxes, gaming consoles, and the like. The individual client devices 108 may include a content viewing component (not shown) that enables a user of client device 108 to consume application objects 132 of an application 130. The content viewing component may be hosted by application hosting platform 102 and may provide a rendered version of the application object 132 for presentation via the UI of a client device 108 during a runtime of the application 130. As described above, client device 108 may have a virtual system running an instance of application 130. The content viewing component may be part of the virtual system and may provide the rendered version of the application object 132, in accordance with embodiments described herein. Further details regarding the virtual system at the client device 108 are provided with respect to FIG. 2.

As described above, application hosting platform 102 may render one or more application objects 132 of an application 130, or an instance of an application 130, running at client device 108. In some embodiments, a shader manager module (e.g., shader manager 204 illustrated in FIG. 2) of the content viewing component at the client device 108 may render an application object 132 by executing one or more programs (referred to as shader programs) at the client device. Each shader program may include a set of operations that enable the content viewing component to render an application object 132 for presentation via the UI of a client device 108. During a runtime of the application 130 at the client device 108, the application 130 may reference an application object 132 that is to be presented via the UI of the client device 108. The shader manager may identify one or more shader programs associated with the referenced application object 132 and may render the referenced application object 132 by executing a compiled version of the one or more shader programs.

In some embodiments, the shader manager may detect that application 130 has referenced an application object 132 and may initiate a compilation process to cause a compiler running on a processor of client device 108 to generate a compiled version of the referenced shader program. In other or similar embodiments, the shader manager may request the compiled version of the referenced shader program from a shader cache 114 hosted by application hosting platform 102. A shader cache 114 refers to a repository of compiled shader programs for one or more application objects 132 referenced by each application 130 hosted by application hosting platform 102. In some embodiments, each compiled shader program may be associated with a particular type of processing device (e.g., a type of graphics processing unit (GPU)) at a client device 108, a particular type of driver of the processing device, a particular pipeline state of the processing device, etc. In some embodiments, shader cache 114 may reside at data store 112. A shader cache engine 110 of application hosting platform 102 may receive the request for the compiled shader program. Shader cache engine 110 may be configured to maintain shader cache 114 for each application 130 hosted by application hosting platform 102. Further details regarding shader cache engine 110 are provided with respect to FIG. 3. It should be noted that, in some embodiments, shader cache engine 110 may reside on a server machine, such as server machine 106, that is separate from a server machines that support application hosting platform 102. In other or similar embodiments, shader cache engine 110 may reside on the server machine that supports application hosting platform 102.

As described above, in some embodiments, the shader manager of a content viewing component at client device 108 may transmit a request for a compiled shader program in response to application 130 (or an instance of application 130) referencing the shader program associated with an application object 132. The shader manager may receive a response to the request that either contains the requested compiled shader program or does not include the requested compiled shader program. If the response includes the requested compiled shader program, the shader manager may execute the compiled shader program to render the application object 132 at the client device 108. If the response does not include the requested compiled shader program, the shader manager may initiate a compilation process to generate a compiled version of the shader program. After executing the compiled shader program (i.e., to render the associated application object 132), the shader manager can, in some embodiments, transmit the compiled shader program to application hosting platform 102 for storage at shader cache 114. Further details regarding the shader manager are provided with respect to FIG. 4.

Figure 1B:
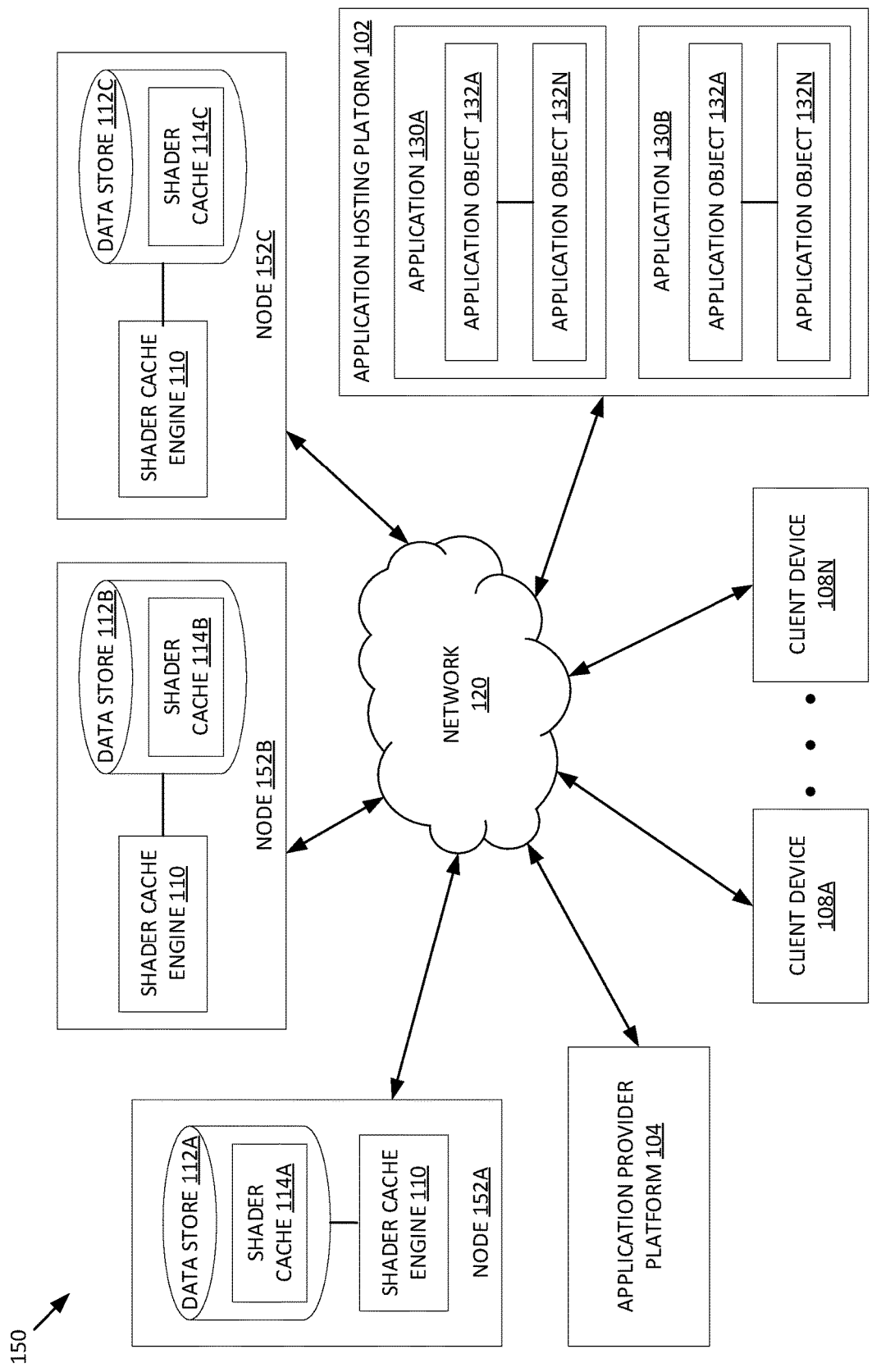
FIG. 1B is a block diagram of another example system architecture, according to at least one embodiment.

FIG. 1B is a block diagram of another example system architecture 150, according to at least one embodiment. In some embodiments, system architecture 150 includes application hosting platform 102, application provider platform 104, nodes 152, and client devices 108, each connected to a network 120, as described with respect to FIG. 1A. Each node 152 may be a grouping of hardware resources and/or software resources that are allocated to service one or more client devices 108 coupled to application hosting platform 102. For example, each node 152 may include a shader cache engine, such as shader cache engine 110. Each node 152 may further include a data store, such as data store 112, that stores a portion of shader cache 114. In an illustrative example, node 152A may include data store 112A, node 152B may include data store 112B and node 152C may include data store 112C. Data stores 112A-C may each be configured to store a portion of shader cache 114 (e.g., shader cache portions 114A-C, respectively). Nodes 152A-C may also be configured to each host shader cache engine 110, in accordance with embodiments described with respect to FIG. 3.

In some embodiments, each portion of shader cache 114 stored at data stores 112A-C may include an initial set of compiled shader programs. The initial set of compiled shader programs may include one or more compiled shader programs that are executed by application hosting platform 102 during an initial period of a runtime of application 130. For example, application 130 may be a video game application. The initial set of compiled shader programs may include one or more compiled shader programs for application objects 132 that are rendered to enable a user accessing the application 130 to set up a profile for the video game application via the client device 108 during a user-setup period of the application 130. In another example, the initial set of compiled shader programs may include one or more compiled shader programs for application objects 132 that are rendered to enable a user to engage with an initial portion of a gaming map associated with the application 130. During an initialization of the application 130 (or instance of application 130) at the client device 108, the shader manager may retrieve the initial set of compiled shader programs from the respective shader cache 114 at a node 152 that is dedicated to the client device 108. For example, node 152A may include resources dedicated for supporting client device 108A. Accordingly, the shader manager for client device 108A may retrieve the initial set of compiled shader programs from shader cache 114A at data store 112A.

The initial set of compiled shader programs may not include compiled shader programs for application objects 132 that are referenced during a subsequent period of the application runtime. Accordingly, during the subsequent period of the application runtime, the shader manager at client device 108A may transmit a request for a compiled shader program to shader cache engine 110 at node 152A. The shader cache engine 110 may determine whether the requested compiled shader program is stored at the portion of shader cache 114 of data store 112A or at another portion of shader cache 114 (e.g., shader cache 114B, 114C). In response to determining that the requested compiled shader program is stored at shader cache portion 114A, shader cache engine 110 may retrieve the requested compiled shader program from shader cache portion 114A and transmit the requested compiled shader program to client device 108A, in accordance with previously described embodiments. In response to determining that the requested compiled shader program is stored at, for example, shader cache portion 114B, shader cache engine 110 at node 152A may transmit the request to shader cache engine 110 node 152B. Shader cache engine 110 at node 152B may retrieve the requested compiled shader program from shader cache 114B and transmit the compiled shader program to client device 108A.

In some embodiments, shader cache engine 110 at node 152A may determine that the compiled shader program requested by client device 108A is not stored at any portion of shader cache 114. In such embodiments, shader cache engine 110 may transmit a message to client device 108A indicating that the compiled shader program is not stored at shader cache 114 and client device 108A may generate the compiled version of the shader program, in accordance with previously described embodiments. The shader manager of client device 108A may transmit the compiled shader program to shader cache engine 110 at node 152A, as previously described, and shader cache engine 110 at node 152A may store the received compiled shader program at shader cache portion 114A. In some embodiments, shader cache engine 110 may transmit the received shader program to shader cache engine(s) 110 running at node 152B and/or 152C. Shader cache engine(s) 110 at nodes 152B and/or 152C may store the received compiled shader program at shader cache portion 114B and/or shader cache portion 114C, in some embodiments.

Figure 2:
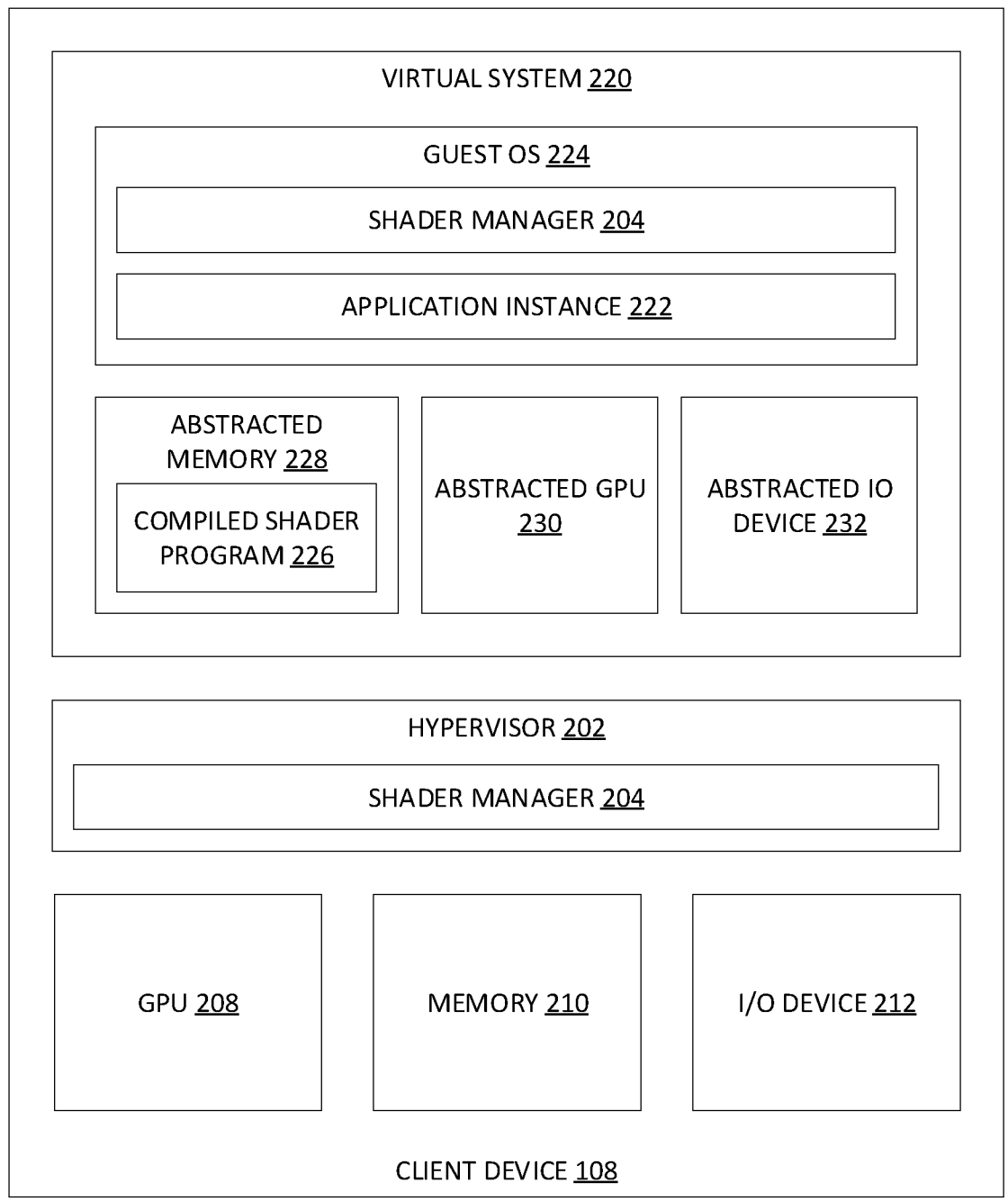
FIG. 2 is a block diagram of a client device hosting a virtual computing system for running an instance of an application, according to at least one embodiment.

FIG. 2 is a block diagram of a client device 108 hosting a virtual system 220 for running an instance 222 of an application, according to at least one embodiment. Client device 108 may execute hypervisor 202, which is configured to manage virtual system 220 running on client device 108. Client device 108 may include one or more physical devices that may be used to support virtual system 220. For example, client device 108 may include a processing device 208 (e.g., a GPU), memory 210, and one or more I/O devices 212. GPU 208 may be communicatively coupled to memory 210 and I/O device 212 via a host bus. In some embodiments, client device 108 may correspond to computer system 1100 and/or computer system 1200 described with respect to FIGS. 11 and 12.

One or more application instances 222 may run on virtual system 220 under a guest operating system (OS) 224. In some embodiments, application instance 222 may be an instance of an application 130 hosted by application hosting platform 102, described with respect to FIG. 1A and FIG. 1B. For example, application instance 222 may be an instance of a video game application 130 provided by a video game application developer via application developer platform 104 and hosted by application hosting platform 102. In such example, virtual system 220 may correspond to a "game seat" (which may represent, for example, a virtual machine or a container) that is instantiated at client device 108 during an initialization of an application instance 222. The "game seat" may be instantiated to facilitate execution of the application instance 222 at client device 108 and may be deconstructed after a termination of the application instance 222 at client device 108, in accordance with embodiments provided herein.

Hypervisor 202 may abstract physical devices of client device 108 and present this abstraction to virtual system 220 as one or more virtual devices. For example, hypervisor 202 may abstract GPU 208 and present this abstraction to virtual system 220 as abstracted GPU 230. Hypervisor 202 may abstract GPU 230 for virtual system 220 by scheduling time slots on GPU 208, rather than dedicating GPU 208 for virtual system 220, in some embodiments. In other or similar embodiments, hypervisor 202 may abstract memory 210 and present this abstraction to virtual system 220 as abstracted memory 228. Hypervisor 202 may abstract memory 210 by employing a page table for translating memory access associated with abstracted memory 228 with physical memory addresses of memory 210. During a runtime of application instance 222 at virtual system 220, hypervisor 202 may intercept virtual memory access operations (e.g., read operations, write operations, etc.) and may translate a virtual memory address associated with the intercepted operations to a physical memory address at memory 210 using the page table. Abstracted memory 228 may be configured to store one or more compiled shader programs 226 that are executed by virtual GPU 230 to render one or more application objects 132 during a runtime of application 130 at virtual computing system 220. In some embodiments, a virtual compiler running on abstracted GPU may compile shader programs (e.g., before or during application runtime) to generate compiled shader programs 226. In other or similar embodiments, virtual system 220 may receive the compiled shader programs 226 from application hosting platform 102, in accordance with embodiments described herein. Hypervisor 202 may also abstract one or more I/O devices 212 at client device 108 and present this abstraction to virtual system 220 as one or more respective abstracted I/O devices 232. Hypervisor 202 may abstract an I/O device 212 by assigning particular port ranges of an interface slot of the I/O device 212 to virtual system 220 and presenting the assigned port ranges as abstracted I/O device 232A. Guest OS 224 may utilize abstracted GPU 230, abstracted memory 228, and/or one or more abstracted I/O devices 232 to support execution of application instance 222 on virtual system 220.

In some embodiments, hypervisor 202 may include a shader manager module 204 (referred to herein as shader manager 204). In other or similar embodiments, guest OS 224 may include shader manager 204. As described with respect to FIGS. 1A and 1B, shader manager 204 can be a portion of a content viewer component of client device 108 and may manage the execution of one or more compiled shader programs 226 for application objects 132 referenced by application instance 222. In some embodiments, shader manager 204 may receive an initial set of compiled shader programs from shader engine 110 (e.g., during an initialization of application instance 222 at virtual system 220), and may store the received set of compiled shader programs at abstracted memory 228. During a runtime of application instance 222, shader manager 204 may detect that application instance 222 has referenced one or more shader programs associated with an application object 132. Shader manager 204 may determine whether compiled shader program 226 for the referenced application object 132 is already stored at abstracted memory 228. In response to determining that compiled shader program 226 is already stored at abstracted memory 228, shader manager 204 may execute compiled shader program 226 (i.e., via abstracted GPU 230). In response to determining that the compiled version of the referenced shader program is not already stored at abstracted memory 228, shader manager 204 may request compiled shader program 226 from shader cache 114 hosted by platform 102, in accordance with previously described embodiments. In response to receiving a message from platform 102 including the compiled shader program 226, shader manager 204 may store the compiled shader program 226 at abstracted memory 228. In response to receiving a message from platform 102 indicating that compiled shader program 226 is not stored at shader cache 114, shader manager 204 may initiate a compilation process to generate the compiled version of shader program 226 and may store the compiled shader program 226 at abstracted memory 228, in accordance with previously described embodiments.

Hypervisor 202 may receive a request to deconstruct virtual system 220, in some embodiments. For example, a user accessing application instance 222 via virtual system 220 may log out of an account associated with application instance 222. In response to detecting that the user has "logged out" of the associated account, guest OS 224 may transmit a request to hypervisor 202 to deconstruct virtual system 220. In some embodiments, hypervisor 202 may deconstruct virtual system 220 by erasing each compiled shader program 226 from abstracted memory 228. Hypervisor 202 may erase each compiled shader program 226 from abstracted memory 228 by identifying a physical address of memory 210 that corresponds to a virtual address for the respective compiled shader program 226 at abstracted memory 228 and erasing the compiled shader program 226 from the identified address at memory 210. After hypervisor 202 has deconstructed virtual system 220, memory 210 may not include any compiled shader programs 226 for application instance 222. Hypervisor 202 may reload at least a portion of the compiled shader programs 226 for application instance 222 to abstracted memory 228 in response to receiving a request to re-construct virtual system 220 and re-initialize application instance 222 via the virtual system 220, in accordance with previously described embodiments.

Caching Compiled Shader Programs in a Cloud Computing Environment

Figure 3:
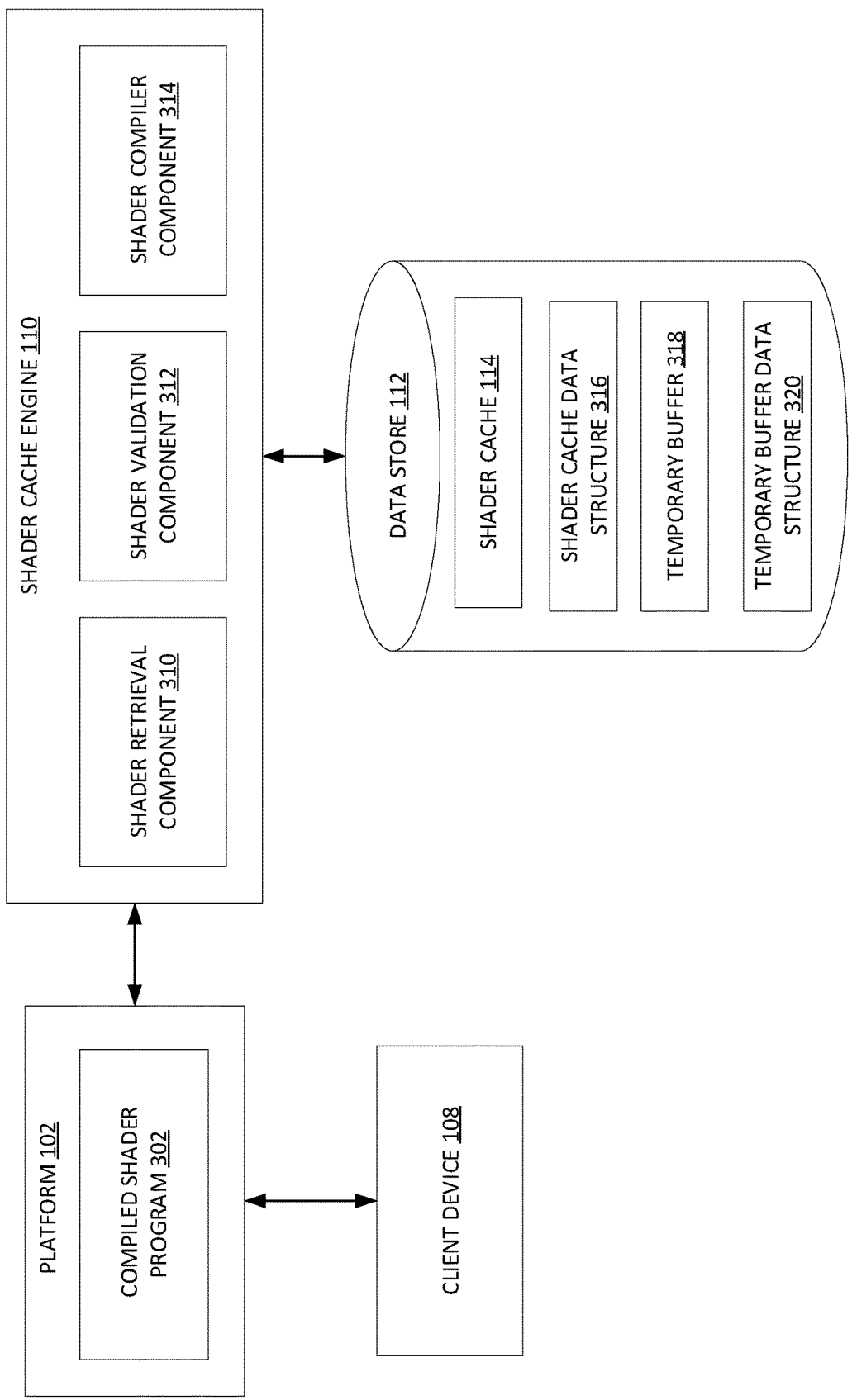
FIG. 3 is a block diagram of a shader cache engine, according to at least one embodiment.

FIG. 3 is a block diagram of a shader cache engine 110, according to at least one embodiment. Shader cache engine 110 may include a shader retrieval component 310, a shader validation component 312, and a shader compiler component 314. As described previously, shader cache engine 110 may reside at a server machine, such as server machine 106 of FIG. 1A, that is part of or separate from application hosting platform 102 (referred to herein as platform 102). In some embodiments, shader cache engine 110 may reside at a node of platform 102, as described with respect to FIG. 1B. A shader manager running on a client device 108, such as shader manager 204 of FIG. 2, may request a compiled shader program 302 from shader cache 114 hosted by platform 102, in accordance with previously described embodiments. Platform 102 may forward the request to shader cache engine 110. Shader retrieval component 310 of shader cache engine 110 may be configured to retrieve a requested compiled shader program 302. In other or similar embodiments, a shader manager 204 at a client device 108 may transmit a request to store a shader program compiled at the client device 108 to shader cache 114, as described previously. Shader validation component 312 of shader cache engine 110 may be configured to validate the received compiled shader program 302 and, responsive to validating the compiled shader program 302, may store the compiled shader program 302 at shader cache 114.

As described above, shader retrieval component 310 may be configured to retrieve a compiled shader program 302 from shader cache 114 at data store 112 in response to receiving a request from a client device 108. The client device 108 may be associated with a shader key that is generated based on state data of client device 108. The state data can correspond to one or more hardware states (e.g., type of processing device, etc.) and/or one or more software states (e.g., type of driver running on a processing device, state of a processing device pipeline etc.) associated with client device 108. For example, a particular type of GPU may be included at client device 108. The shader key associated with the client device 108 may be generated based on an indication of the type of GPU at client device 108. In another example, a particular version of a device driver may be running at the GPU at client device 108. In such examples, the shader key associated with the client device 108 may be further generated based on an indication of the version of the driver running at the GPU. In some embodiments, the shader key may be generated by a processing device (e.g., at client device 108, at server machine 106) applying a hashing function to the state data of client device 108.

In some embodiments, the shader key associated with client device 108 can be further generated based on a source code of the requested shader program. In other or similar embodiments, a shader value can be generated for the requested shader program based on a source code of the shader program. In some embodiments, the shader value may be generated by a processing device (e.g., at client device 108, at server machine 106) applying a hashing function to the source code of the shader program, as previously described.

In some embodiments, client device 108 may include the shader key and/or the shader value with the request for compiled shader program 302. In other or similar embodiments, client device 108 may transmit an indication of a hardware condition and/or a software condition associated with client device 108 with the request for compiled shader program 302. In such embodiments, shader retrieval component 310 may generate the shader key for client device 108, as previously described. In additional or alternative embodiments, shader retrieval component 310 may obtain the source code of the requested shader program (e.g., from data store 112, from client device 108) and generate the shader value, in accordance with previously described embodiments.

As described previously, data store 112 may store shader cache 114. In some embodiments, data store 112 may also include a shader cache data structure 316, which is configured to include a mapping between a shader key and/or shader value associated with each compiled shader program 302 stored at shader cache 114 and a memory address of shader cache 114 that stores the respective compiled shader program 302. FIG. 4 depicts an example shader cache data structure 316, according to at least one embodiment. Each entry 402 of shader cache data structure 316 may include a shader key field 404, a shader value field 406, and a memory address field 408. In some embodiments, each entry 402 may further include a node field 410 and/or a shader set field 412. Shader key field 404 of each entry 402 may include an indication of a shader key for a client device that is compatible with the compiled shader program 302 stored at the memory address of shader cache 114, as indicated in memory address field 408. Shader value field 406 may include an indication of a shader value associated with the compiled shader program 302 stored at the memory address of shader cache 114.

In some embodiments, the shader key indicated in a shader key field 404 of an entry 402 may correspond to a shader key associated with another client device that compiled the shader program and transmitted the shader program to shader cache engine 110 for storage at shader cache 114. For example, client device 108N may compile a shader program 302 and transmit the compiled shader program 302 to platform 102 for storage at shader cache 114, in accordance with previously described embodiments. Shader validation component 312 may obtain a shader key (e.g., "9J6K3D") and/or shader value (e.g., "3 S09V2S3N3") associated with the compiled shader program 302 and, in response to validating the compiled shader program 302, shader validation component 312 may store the compiled shader program 302 at shader cache 114. Shader validation component 312 may also generate an entry 402 of data structure 316 that indicates a mapping of the obtained shader key (e.g., "9J6K3D") and/or obtained shader value (e.g., "3 S09V2S3N3") for the compiled shader program 302 and the memory address at shader cache 114 (e.g., "0X10010000") that stores the compiled shader program 302. Further details regarding shader validation component 312 are provided herein.

In an illustrative example, a client device 108A may request, from shader cache 114, a compiled shader program 302 that is associated with shader key "9J6K3D" and/or shader value "3 S09V2S3N3." Shader retrieval component 310 may obtain the shader key associated with the requested compiled shader program 302 and may compare the obtained shader key to the shader key indicated in the shader key field of one or more entries 402 of data structure 316. Shader retrieval component 310 may also obtain the shader value associated with the requested compiled shader program 302 and compare the obtained shader value to the shader value indicated in the shader value field 406 for the one or more entries 402 of data structure 316. Shader retrieval component 310 may identify an entry 402 of data structure 316 that corresponds to the obtained shader key and/or obtained shader value for the requested compiled shader program 302 (i.e., based on the shader key field 405 and/or shader value field 406). The identified entry may have been generated in response to client device 108N compiling the shader program and providing the compiled shader program 302 for storage at cache 114, as described above. Responsive to identifying the entry 402 that is associated with the compiled shader program 302, shader retrieval component 310 may determine the memory address associated with the compiled shader program 302 at shader cache 114 (i.e., based on the memory address field 408 of the identified entry) and may retrieve the compiled shader program 302 from the determined memory address. Shader retrieval component 310 may transmit the retrieved compiled shader program 302 to client device 108A via platform 102, in accordance with previously described embodiments.

In additional or alternative embodiments, a compiled shader program 302 associated with an entry 402 of data structure 316 may be compiled by shader compiler component 314, rather than a client device 108. Shader compiler component 314 may compile one or more shader programs and store the compiled shader programs at shader cache 114, in accordance with previously described embodiments. For example, an application developer may provide platform 102 with an initial set of shader programs that may be referenced during an initial period of an application runtime. Shader compiler component 314 may generate compiled versions of the initial set of shader programs that are compatible with client devices associated with multiple different hardware states and/or multiple different software states. Shader compiler component 314 may also generate a shader key for each version of the compiled shader program 302 that indicates the hardware state and/or software state associated with the respective compiled shader program version and, in some embodiments a shader value for each compiled shader program 302. Responsive to storing the different compiled shader program versions to shader cache 114, shader compiler component 314 may generate an entry for each shader program version at shader cache data structure 316 where each entry includes a mapping between a shader key, a shader value, and a memory address of shader cache 114 that stores a respective compiled shader program 302.

In some embodiments, shader compiler component 314 may compile one or more shader programs responsive to detecting that a hardware state and/or a software state (e.g., driver version, etc.) at one or more client devices 108 connected to platform 102 has been updated or is going to be updated. For example, shader compiler component 314 may receive a notification from a client device 108 and/or another component of platform 102 indicating that a driver running on the client device has been updated or is going to be updated from a first version to a second version. In another example, shader compiler component 314 may detect that a current version of the shader key included in current requests received from the client device 108 (i.e., requests for compiled shader programs 302 from shader cache 114 or to add compiled shader programs 302 to shader cache 114) is different from a prior version of the shader key included in prior requests received from the client device 108. The difference in the current version of the shader key and the prior version of the shader key can indicate that a driver running on the client device 108 has been updated from a first version to a second version. In response to detecting that the driver running on the client device 108 has been updated or is going to be updated from the first version to a second version, shader compiler component 314 can identify an entry 402 at data structure 316 including a shader key that corresponds to the first version of the driver. Shader compiler component 314 can obtain the source code for the compiled shader program 302 associated with the identified entry and initiate a compilation process to generate an updated compiled version of the shader program that is compatible with the second version of the driver. Shader compiler component 314 can store the updated compiled shader program 302 to the shader cache 114, in accordance with embodiments provided herein and can generate an entry 402 for data structure 316 that corresponds to the updated compiled shader program 302. In some embodiments, shader compiler component 314 can remove the entry 402 including the shader key that corresponds to the first version of the driver from data structure 316 (e.g., in response to determining that the first version of the driver is obsolete, etc.).

As described with respect to FIG. 1B, platform 102 may run on multiple nodes 152 that may each host a data store 112 that is configured to store a portion of shader cache 114. Node field 410 of data structure 316 may indicate a node 152 that stores a portion of shader cache 114 that includes a requested compiled shader program 302. In an illustrative example, a client device 108A may transmit a request to platform 102 for a compiled shader program 302. Node 152A may include resources (e.g., shader cache engine 110, data store 112A, etc.) that are dedicated to support an instance of application 130 running on a virtual system of client device 108A (e.g., application instance 222 running on virtual system 220). Shader retrieval component 310 of shader cache engine 110 at node 152A may obtain the shader key associated with client device 108A (e.g., "9J6K3D") and/or shader value associated with the requested shader program (e.g., "3S09V2S3N3") and may determine whether an entry of data structure 316 corresponds to the obtained shader key and/or shader value, in accordance with previously described embodiments. In response to identifying an entry 402 of data structure 316 that corresponds to the obtained shader key and/or shader value, shader retrieval component 310 may determine which node 152 of platform 102 stores a portion of shader cache 114 that includes the requested compiled shader program 302 based on the node field 410 of the identified entry 402. As illustrated in FIG. 4, shader retrieval component 310 may determine that the requested compiled shader program associated with the shader key "9J6K3D" and shader value "3 S09V2S3N3" is included at a portion of shader cache 114 that is stored at data store 112A of node 152A. Accordingly, shader retrieval component 310 may retrieve the requested compiled shader program 302 from the memory address indicated in the memory address field 408 of the identified entry at the portion of shader cache 114 of node 152A. However, if shader retrieval component 310 determines that the requested compiled shader program 302 is included at a portion of shader cache 114 that is stored at data store 112B of node 152B, for example, shader retrieval component 310 may forward the request for the compiled shader program to the shader cache engine 110 running on node 152B and shader cache engine 110 on node 152B may retrieve the requested compiled shader program for client device 108A, in accordance with previously described embodiments.

In some embodiments, entries of data structure 316 may not include a node field 410, as illustrated in FIG. 4. In such embodiments, shader retrieval component 310 may determine a node that stores a portion of shader cache 114 that includes a requested compiled shader program in accordance with other embodiments. For example, a memory address included in a memory address field 408 of an entry 402 may correspond to a distinct portion of memory associated with data stores 112A-C, respectively. Accordingly, shader retrieval component 310 may determine the node that stores the portion of shader cache 114 that includes the requested compiled shader program based on the memory address of the memory address field 408 for each entry 402. In another example, data structure 316 may be separated into data structures 316A-C that each reside at data stores 112A-C, respectively. Each data structure 316A-C may be configured to include a mapping for each compiled shader program stored at a portion of shader cache that is also stored at data store 112A-C, but not at other data stores 112A-C. For example, data structure 316A may be configured to include a mapping of each compiled shader program 302 stored at shader cache portion 114A at data store 112A, but not shader cache portions 114B-C at data stores 112B-C. In response to determining that a requested compiled shader program is not stored at shader cache portion 114A, shader retrieval component 310 may transmit an inquiry to shader cache engines 110 at nodes 152B-C to determine whether the requested compiled shader program 302 is stored at shader cache portions 114B or 114C. In response to determining that the requested compiled shader program 302 is stored at shader cache portions 114B or 114C, shader retrieval component 310 may forward the request from client device 108A to nodes 152B or 152C and shader cache engine 110 at nodes 152B or 152C may handle the request, in accordance with previously described embodiments. Additionally or alternatively, shader cache engine 110 at nodes 152B or 152C may transmit the requested compiled shader program 302 to shader cache engine 110 at node 152A and shader retrieval component 310 may store the requested compiled shader program 302 at shader cache portion 114A, in accordance with previously described embodiments. Shader retrieval component 310 may then provide the requested compiled shader program 302 to client device 108A in accordance with the request.

As described previously, in some embodiments, entries 402 of data structure 316 may include a shader set field 412 that is configured to indicate a set of shader programs that includes a particular shader program. In some embodiments, a set of shader programs may correspond to one or more compiled shader programs that are likely to be requested (e.g., within a particular time period) following a request for a particular compiled shader program. For example, a requested compiled shader program may correspond to a video game mapping object that is associated with a portion of a video game application map that a user of client device 108 has accessed for the first time. The requested compiled shader program may be included in a set of shader programs that is associated with the newly accessed portion of the video game application map. In some embodiments, one or more sets of shader programs may be defined by a developer of the application 130. In other or similar embodiments, one or more sets of shader programs may be determined by shader retrieval component 310 during a runtime of application 130 at one or more client devices 108. For example, during a runtime of application 130 at an initial set of client devices 108, shader retrieval component 310 may determine that one or more particular compiled shader programs are requested by the initial set of client devices 108 within a particular time period. Shader retrieval component 310 may associate each of the particular requested compiled shader programs with an identifier for a respective set of shader programs that are to be sent to subsequent client devices 108 that request the compiled shader program 302. Shader retrieval component 310 may update the shader set field 412 for the entries 402 associated with each compiled shader program to indicate that the respective compiled shader program 302 is associated with the set of shader programs, as illustrated in FIG. 4.

Shader retrieval component 310 may use the shader set field 412 of entries 402 to identify multiple additional compiled shader programs 302 to transmit to a client device 108 in response to a request, in some embodiments. After identifying a respective entry 402 in response to a request for a compiled shader program 302, shader retrieval component 310 may determine a shader program set associated with the requested shader program 302 based on the shader set field 412 of the identified entry 402. In response to determining a set associated with the requested shader program 302, shader retrieval component 310 may identify entries 402 for each other compiled shader program 302 stored at shader cache 114 that is also associated with the determined set. Rather than transmitting only the requested compiled shader program 302 to client device 108, shader retrieval component 310 may transmit each compiled shader program 302 at shader cache 114 that is associated with the determined set to client device 108.

In an illustrative example, shader retrieval component 310 may receive a request for compiled shader program 302 and the request may include an indication of shader key "9J6K3D" and a shader value "3 S09V2S3N3." Shader retrieval component 310 may identify the entry 402 associated with the requested compiled shader program 302 and may determine that the requested compiled shader program 302 is associated with shader set "1" (i.e., based on the shader set field 412 of entry 402). Shader retrieval component 310 may parse through data structure 316 and determine that a compiled shader program associated with shader key "8N3020" and shader value "74FSW238FN" is also associated with shader set "1". Accordingly, shader retrieval component 310 may retrieve the compiled shader programs associated with shader keys "9J6K3D" and "8N3020" from the memory addresses at shader cache 114, as indicated in respective entries 402, and transmit the retrieved compiled shader programs 302 to client device 108, in accordance with previously described embodiments.

In some embodiments, shader set field 412 of entry 402 may not include an identifier for a set of shader programs associated with a respective compiled shader program 302 stored at shader cache 114. Instead, in some embodiments, shader set field 412 may include an identifier for each shader key and/or shader value associated with compiled shader programs 302 that are associated with a set. In such embodiments, shader retrieval component 310 may identify entries 402 associated with each shader key and/or shader value indicated in the shader set field 410 for a requested compiled shader program 302 and may retrieve the compiled shader programs 302 from a portion of shader cache 114 associated with a memory address for each associated compiled shader program 302, as indicated in the memory address field 408 of each identified entry.

In additional or alternative embodiments, data structure 316 may not include a shader set field 412. In such embodiments, shader retrieval component 310 may determine compiled shader programs at shader cache 114 that should be sent to client device 108 with a requested compiled shader program according to other techniques. For example, in response to receiving a request for a compiled shader program 302 from client device 108, shader retrieval component 310 may provide a shader key and/or shader value associated with the requested compiled shader program 302 as input to a machine learning model. The machine learning model may be trained (e.g., based on experimental data, based on application runtime data, etc.) to determine which compiled shader programs 302 are likely to be requested (e.g., within a particular time period) after the request for the compiled shader program 302 is received. Shader retrieval component 310 may obtain one or more outputs of the trained machine learning model. The outputs may include shader keys and/or shader values for one or more compiled shader programs 302 stored at shader cache 114 and an indication of a level of confidence that each respective compiled shader program 302 is to be requested by client device 108 (e.g., within the particular time period). Shader retrieval component 310 may identify one or more compiled shader programs 302 associated with a level of confidence that exceeds a threshold level of confidence and may identify a memory address of shader cache 114 that stores each of the identified compiled shader programs (e.g., via data structure 316). Shader retrieval component 310 may retrieve the requested compiled shader program 302 and the identified compiled shader programs 302 from shader cache 114 and transmit the retrieved compiled shader programs to client device 108, in accordance with previously described embodiments.

In some embodiments, shader retrieval component 310 may determine that a compiled shader program 302 requested by client device 108 is not stored at shader cache 114. In some embodiments, shader retrieval component 310 may transmit a message to client device 108 indicating that the requested compiled shader program 302 is not stored at shader cache 114. As described previously, client device 108 may initiate a compilation process to generate a compiled version of the shader program and may transmit the compiled shader program 302 to platform 102 for storage at shader cache 114. Shader validation component 314 may validate the received compiled shader program 302 before storing the compiled shader program 302, in some embodiments. Shader validation component 314 may store the received compiled shader program 302 at a temporary buffer 318 at data store 112. The temporary buffer 318 may be a portion of memory at data store 112 that is configured to temporarily store compiled shader programs 302 received from client devices before the respective compiled shader program 302 is validated by shader validation component 312.

Shader validation component 312 may track each respective compiled shader program 302 that is temporarily stored at temporary buffer 318 using a temporary buffer data structure 320. Temporary buffer data structure 320 includes a mapping of a shader key and/or shader value associated with a compiled shader program and a memory address for a portion of temporary memory buffer 318 that temporarily stores the compiled shader program. FIG. 5 depicts an example temporary buffer data structure 320, in accordance with at least one embodiment. Each entry 502 of data structure 320 may include a shader key field 504, a shader value field 506, a temporary buffer memory address field 510, and a validation counter field 512. In some embodiments, each entry 502 of data structure 320 may also include a client device identifier field 508.

In response to receiving a request to add a compiled shader program 302 to shader cache 114, shader validation component 312 may determine whether the compiled shader program 302 is already stored at shader cache 114 and/or at temporary buffer 318. The request may include a shader key and/or shader value associated with the compiled shader program 302, in accordance with previously described embodiments. In some embodiments, the request may include a shader key and shader validation component 312 may generate a shader value for the received shader program 302 (e.g., by applying a hashing function to source code of the received compiled shader program 302). Shader validation component 312 may parse through shader cache data structure 316 and determine whether an entry 402 of data structure 316 corresponds to the shader key and/or shader value for the received compiled shader program (i.e., based on the shader key field 404 and/or the shader value field 406 of each entry 402). In some embodiments, responsive to determining that an entry 402 corresponds to the shader key and/or the shader value for the received compiled shader program 302, shader validation component 312 may transmit a notification to client device 108 indicating that the received compiled shader program 302 is already stored at shader cache 114. In other or similar embodiments, shader validation component 312 may not transmit any notification to client device 108 and may disregard the request to store the compiled shader program 302 at shader cache 114.

In response to determining that no entries of data structure 316 correspond to the shader key and/or shader value for the received compiled shader program 302, shader validation component may parse through temporary buffer data structure 320 to determine whether an entry 502 of temporary buffer data structure 320 corresponds to the shader key and/or shader value associated with the received compiled shader program 302 (i.e., via shader key field 504 and/or shader value field 506 for each entry 502). In response to determining that no entry 502 of data structure 320 corresponds to the shader key and/or shader value for the compiled shader program 302, shader validation component 312 may temporarily store the received compiled shader program 302 at temporary buffer 318 and generate an entry 502 of data structure 320 for the compiled shader program 302. Shader validation component 312 may populate the shader key field 504 for the generated entry 502 with the shader key associated with the user device and the shader value field 506 with the shader value generated for the compiled shader program 302. Shader validation component 312 may also obtain an identifier associated with client device 108 and populate the client device identifier field with the obtained identifier. In some embodiments, the request to store the compiled shader program 302 at shader cache 114 may include an identifier associated with the client device 108. In other or similar embodiments, the client device identifier may be associated with the virtualized system 220 constructed at the client device 108 to support the application instance 222, rather than the client device 108 itself. Shader validation component 312 may also populate the temporary buffer memory address field 510 with the physical address of temporary buffer 318 that stores the compiled shader program 302.

In some embodiments, shader validation component 312 may initialize a validation counter for the compiled shader program and add a current value of the validation counter to the validation counter field 512. The validation counter may track a number of distinct client devices or virtualized computing systems running at client devices that have transmitted a request to store a compiled shader program 302 associated with the corresponding shader value and shader key at shader cache 114. Validation component 312 may initialize the validation counter for compiled shader program 302 by setting the current value of the validation counter to a value of "1," in some embodiments. In an illustrative example, client device 108A associated with the shader key of "66HY32" may transmit a request to store a compiled shader program 302 at shader cache 114. Shader validation component 312 may obtain a shader value for the compiled shader program 302 (e.g., "25FW5FN20") and may determine whether the compiled shader program is already stored at shader cache 114 and/or temporary buffer 318, in accordance with previously described embodiments. Responsive to determining that the compiled shader program 302 is not stored at shader cache 114 or temporary buffer 318, shader validation component 312 may store the compiled shader program 302 at temporary buffer 318 and generate an entry 502 of the compiled shader program at data structure 320. For instance, shader validation component 312 may obtain a client device identifier associated with client device 108A and populate client device identifier field 508 with the obtained client device identifier. Shader validation component 312 may set the current value of the validation counter to "1" as no other client devices 108 have transmitted a request to store a compiled shader program 302 associated with the corresponding shader key and shader value to shader cache 114.

In some embodiments, shader validation component 312 may determine that a received compiled shader program 302 is already stored at temporary buffer 318, in accordance with previously described embodiments. Shader validation component 312 may identify an entry 502 of data structure 320 that corresponds to the received compiled shader program 302 (i.e., based on the shader key field 504 and the shader value field 506 for each entry 502). Shader validation component 312 may obtain a client device identifier associated with client device 108 and compare the obtained identifier to the device identifiers included in the client device identifier field 508 of the identified entry. In response to determining that the obtained identifier corresponds to a device identifier already included in the client device identifier field 508, shader validation component 312 may transmit a notification to the client device 108 indicating shader validation component 312 has already received a request to store the compiled shader program 302 at shader cache 114.

In additional or alternative embodiments, shader validation component 312 may not transmit a notification to client device 108 and instead may dismiss the request to store the compiled shader program 302 at shader cache 114. In response to determining that the obtained identifier does not correspond to a device identifier included in the client device identifier field 508 of the identified entry 502, shader validation component 312 may increase a current value of the validation counter associated with the compiled shader program 302 and update the validation counter field 512 of the identified entry to reflect the increased value of the validation counter.

In one illustrative example, client device 108B may transmit requests to platform 102 to store a respective compiled shader program 302 at shader cache 114. Client device 108B may be associated with a shader key of "3DS02F" and a client device identifier of "5844." Shader validation component 312 may generate a first shader value (e.g., "3DDG538WD") for the compiled shader program 302 received from client device 108B and may identify a first entry 502 that is associated with the first shader value and the shader key associated with client device 108B. In response to determining that the client device identifier associated with client device 108B (i.e., "5844") does not correspond to a device identifier included in client device identifier field 508 of the first entry 502, shader validation component 312 may update a value of a validation counter for the compiled shader program (e.g., by incrementing the current value by "1").

In another illustrative example, client device 108N may transmit a request to platform 102 to store a respective compiled shader program 302 at shader cache 114. Client device 108N may be associated with a shader key of "FD93X3" and a client device identifier of "1008." Shader validation component 312 may generate a second shader value (e.g., "ZDG26SF29") for the compiled shader program 302 received from client device 108N and may identify a second entry 502 that is associated with the second shader value and the shader key associated with client device 108N. In response to determining that the client device identifier associated with client device 108N (e.g., "1008") corresponds to a device identifier included in client device identifier field 508 of the second entry 502, shader validation component 312 transmit a notification to client device 108N, as previously described, or may disregard the request from client device 108N to store the compiled shader program 302 at shader cache 114. In some embodiments, shader validation component 312 may initiate a security procedure with respect to client device 108N (e.g., by reporting client device 108N to a security component of platform 102, etc.).

In some embodiments, shader validation component 312 may determine that a current value of a validation counter associated with a compiled shader program 302 satisfies a validation criterion. For example, shader validation component 312 may determine that a current value of the validation counter indicated in a validation counter field 512 of an entry meets or exceeds a threshold counter value. The threshold counter value may correspond to a previously defined number of client devices that (e.g., by platform 102, by the application developer, etc.) have previously submitted a compiled version of a shader program 302 for storage at shader cache 114 such that the compiled shader program 302 is determined to be safe (e.g., non-malicious, no bugs present, etc.). In response to determining that a current value of a validation counter satisfies the validation criterion, shader validation component 312 may store the compiled shader program 302 at shader cache 114 and generate an entry for the compiled shader program 302 at shader cache data structure 316, in accordance with previously described embodiments. Shader validation component 312 may also erase the compiled shader program 302 from temporary buffer 318 and remove the entry 502 for the compiled shader program 302 from temporary buffer data structure 320. Once the compiled shader program 302 is moved from temporary buffer 318 to shader cache 114, shader retrieval component 310 may provide the compiled shader program 302 in response to requests from client devices 108, in accordance with previously described embodiments.

In some instances, a compiled shader program 302 may remain at temporary buffer 318 without being moved to shader cache 114 for a significant period of time. In some embodiments, shader validation component 314 may maintain a timer for each shader program 302 stored at temporary buffer 318. In response to a time for a respective shader program 302 exceeding a threshold value, shader validation component 314 may erase the compiled shader program 302 from temporary buffer 318 and may erase the entry 502 associated with the compiled shader program 302 from data structure 320. Additionally or alternatively, in response to determining that temporary buffer 318 does not have sufficient space to temporarily store each received compiled shader program 302, shader validation component may remove the compiled shader program 302 from temporary buffer 318 that is older than other compiled shader programs 302 at temporary buffer 318 (e.g., in view of the timer).

As described above, each compiled shader program 302 may be compatible with a client device 108 associated with a particular hardware state and/or software state. As also described above, a hardware state and/or software state for client devices 108 connected to platform 102, in some instances, can be updated from a first version to a second version. In some embodiments, the first version of the hardware state and/or the software state can be obsolete (i.e., no client devices 108 currently connected to platform 102 are associated with the first version of the hardware state and/or the software state). For example, a set of client devices 108 requesting and providing compiled shader programs 302 to platform 102 can each include a first version of a processing device. Accordingly, shader cache 114 can store compiled shader programs 302 that are compatible with the first version of the processing device. Over time, the processing devices at the set of client devices 108 can be updated to a second version, such that no client devices 108 connected to platform 102 include the second version of the processing device. One or more components of shader cache engine 110 (e.g., shader compiler component 314) can detect that the compiled shader programs 302 that are compatible with the first version of the processing device are obsolete and can remove these compiled shader programs 302 from shader cache 114, in accordance with previously disclosed embodiments. Shader cache engine 110 can also remove compiled shader programs 302 from shader cache 114 that are associated with an obsolete version of a driver, in accordance with embodiments described with shader compiler component 314.

Figure 6:
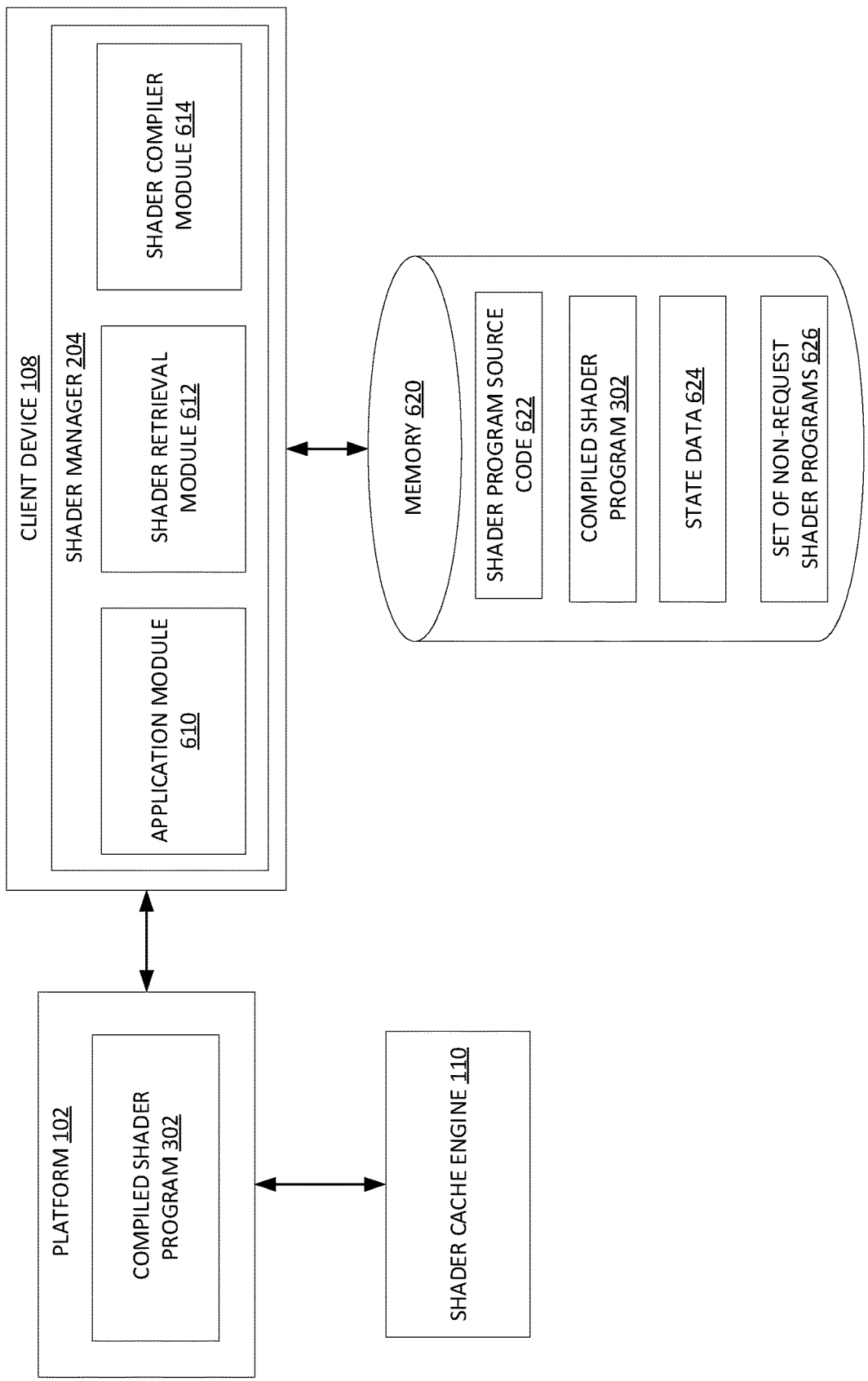
FIG. 6 is a block diagram of a shader manager running on a client device, according to at least one embodiment.

FIG. 6 is a block diagram of a shader manager 204 running on a client device 108, according to at least one embodiment. In some embodiments, shader manager 204 may be part of a content viewing component at client device 108, as previously described. In other or similar embodiments, shader manager 204 may be executed by hypervisor 202 and or a guest OS 224 of a virtualized system 220. Shader manager 204 may include an application module 610, a shader retriever module 612, and a shader compiler module 614. Client device 108 may be coupled to memory 620, in some embodiments. Memory 620 may correspond to memory 210 and/or memory 228, described with respect to FIG. 2.

Application module 610 may be configured to detect when an application 130, or an application instance 222, running at client device 108 references a particular shader program during an application runtime. In some embodiments, the application 130 may reference the shader program by referencing an application object 132 that is associated with the shader program. In other or similar embodiments, application 130 may reference the shader program by directly referencing the shader program. In response to detecting that application 130 has referenced the shader program, application module 610 may determine whether a compiled version of the shader program (i.e., compiled shader program 302) is stored at memory 620. If compiled shader program 302 is stored at memory 620, application module 610 may execute the compiled shader program 302 in accordance with the reference by application 130. In response to application module 610 determining that compiled shader program 302 is not stored at memory 620, shader retrieval module 612 may request the compiled shader program 302 from shader cache 114 hosted by platform 102, in accordance with previously described embodiments.

In some embodiments, during an initialization of application 130 at client device 108 (or an initialization of application instance 222 at virtual system 220, platform 102 may transmit a notification to client device 108 including an indication of a set of non-request shader programs 626 that should not be requested from shader cache 114. The set of non-request shader programs 626 may include shader programs defined (e.g., by platform 102, by application developer, etc.) to consume a significant amount of space at shader cache 114, to consume a significant amount of network bandwidth during a retrieval from shader cache 114, or to be insecure (e.g., prone to bugs, prone to malicious attacks) for storage at shader cache 114. In response to detecting application 130 reference a shader program, application module 610 may determine whether the referenced shader program is included in the set of non-request shader programs 626. In response to application module 610 determining the referenced shader program is included in set 626, shader compiler module 614 may compile the referenced shader program locally, in accordance with embodiments described herein.

In some embodiments, shader retrieval module 612 may generate a shader key associated with client device 108 (e.g., using state data 624 stored at memory 620). State data 624 may include any data associated with a hardware state (e.g., a type of processing device at client device 108) or a software state (e.g., a version of a driver running at the processing device, a current state of the pipeline of the processing device, etc.) associated with client device 108. Shader retrieval module 612 may generate the shader key by applying a hash function to an indicator of the hardware state and/or the software state associated with the client device 108. In some embodiments, shader retrieval module 612 may transmit the shader key to platform 102 with the request for compiled shader program 302, as previously described.

In some embodiments, shader manager 204 may receive a message from platform 102, which may or may not include the compiled shader program 302. Shader retrieval module 612 may parse the received message to determine whether the message includes the compiled shader program 302. In response to shader retrieval module 612 determining that the message includes the compiled shader program 302, application module 610 may store the received compiled shader program 302 at memory 620 and may execute the compiled shader program 302 in accordance with the reference by application 130. In response to shader retrieval module 612 determining that the message does not include the compiled shader program 302, shader compiler module 614 may retrieve a source code 622 of the shader program and may initiate a compilation process to compile the shader program locally, in accordance with previously described embodiments. In some embodiments, the shader program source code 622 may be stored at memory 620. For example, during an initialization of application 130 at client device 108, platform 102 may transmit the source code 622 of each shader program for the application 130 to client device 108. Accordingly, shader compiler module 614 may retrieve the source code 622 of the shader program from memory 620 and compile the shader program locally, as previously described. In other or similar embodiments, shader compiler module 614 may transmit a request to platform 102 for the source code 622 of the shader program.

In response to completing the process to generate a compiled version of shader program 302, shader compiler module 614 may transmit the compiled shader program 302 to platform 102 for storage at shader cache 114, in accordance with previously described embodiments. Shader compiler module 614 may transmit the compiled shader program 302 to platform 102 with the shader key associated with client device 108, in some embodiments. In additional or alternative embodiments, shader compiler module 614 may generate a shader value associated with compiled shader program 302 (e.g., by applying a hashing function to compiled shader program 302) and transmit the generated shader value to platform 102 with compiled shader program 302.

In some embodiments, in response to shader retrieval module 612 transmitting a request to platform 102 for a compiled shader program 302, shader compiler module 614 may initiate a process to compile the shader program (i.e., based on shader program source code 622), as described above. In response to shader compiler module 614 completing the compilation process before a message is received from platform 102, shader retrieval module 612 may terminate the request to platform 102 and application module 610 may execute the shader program compiled by shader compiler module 614. In response to shader retrieval module 612 receiving compiled shader program 302 before the compilation process initiated by shader compiler module 614 is completed, shader compiler module 614 may terminate the compilation process and application module 610 may execute the compiled shader program 302 received from platform 102.

Figure 7:
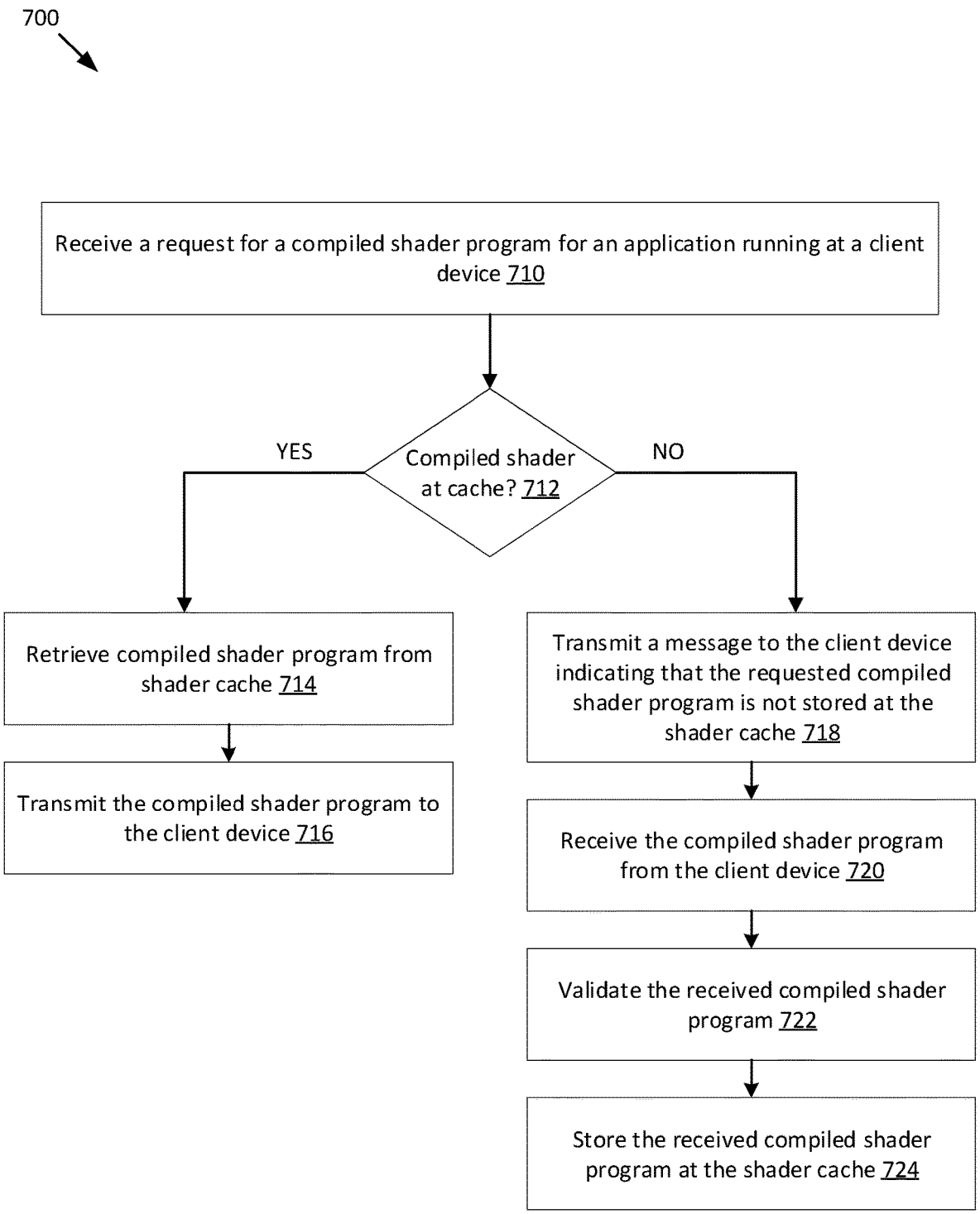
FIG. 7 illustrates a flow diagram of an example method of providing a compiled shader program to a client device, according to at least one embodiment.
Figure 8:
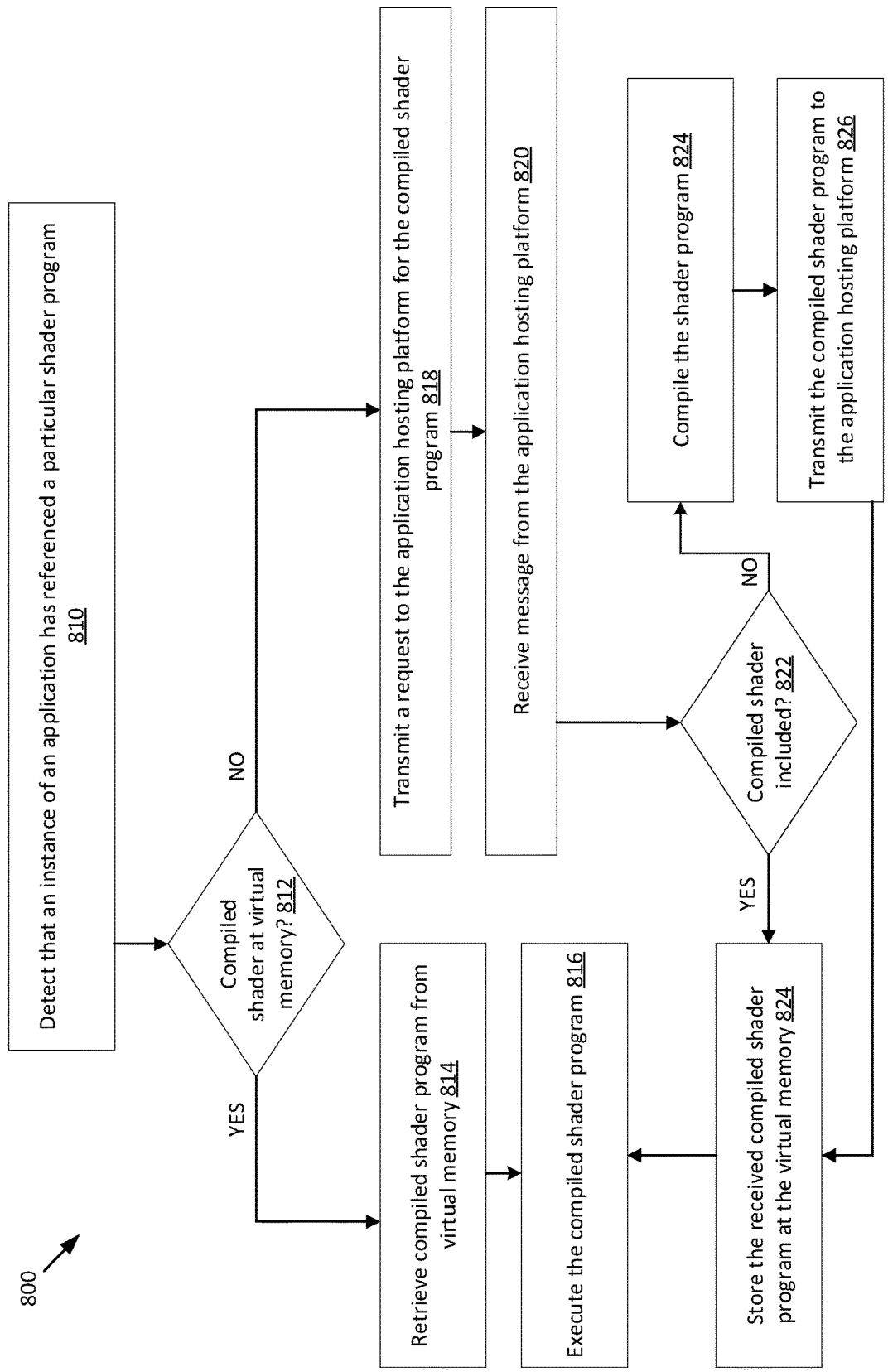
FIG. 8 illustrates a flow diagram of an example method of requesting a compiled shader program by a client device, according to at least one embodiment.

FIG. 7 and FIG. 8 are flow diagrams of example methods 700 and 800 respectively that are related to caching of compiled shader programs at a cloud computing environment, according to at least some embodiments. In at least one embodiment, method 700 and/or method 800 may be performed by server machine 106, client device 108, or some other computing device, or a combination of multiple computing devices. Method 700 and/or method 800 may be performed by one or more processing units (e.g., CPUs and/or GPUs), which may include (or communicate with) one or more memory devices. In at least one embodiment, method 700 and/or method 800 may be performed by multiple processing threads (e.g., CPU threads and/or GPU threads), each thread executing one or more individual functions, routines, subroutines, or operations of the method.

In at least one embodiment, processing threads implementing method 700 and/or method 800 may be synchronized (e.g., using semaphores, critical sections, and/or other thread synchronization mechanisms). Alternatively, processing threads implementing method 700 and/or method 800 may be executed asynchronously with respect to each other. Various operations of method 700 and/or method 800 may be performed in a different order compared with the order shown in FIG. 7 and/or FIG. 8. Some operations of the methods may be performed concurrently with other operations. In at least one embodiment, one or more operations shown in FIG. 7 and/or FIG. 8 may not always be performed.

FIG. 7 illustrates a flow diagram of an example method 700 of providing a compiled shader program to a client device, according to at least one embodiment. In some embodiments, one or more operations of method 700 may be performed by one or more components or modules of shader cache engine 110, described herein. Processing units performing method 700 may receive, at block 710, a request for a compiled shader program for an application running at a client device. In some embodiments, processing units performing method 700 may receive the request from a virtual system running an instance of an application, such as virtual system 220 running application instance 222. The request may include, in some embodiment, a shader key associated with the client device and/or a shader value associated with the shader program. The shader key may be generated based on an indication of a particular type of hardware associated with the client device (e.g., the type of GPU at the client device) and/or the particular type of software associated with the client device (e.g., the type of driver running at the GPU). The shader value may be generated based on source code of the shader program.

In some embodiments, processing units performing method 700 may determine whether providing the compiled shader program in accordance with the request will satisfy a performance criterion associated with the application hosting platform. For example, processing units performing method 700 may determine whether an amount of time for the shader cache engine to retrieve the requested compiled shader program exceeds the amount of time for the client device to compile the requested shader program. In response to determining that the amount of time to retrieve the requested compiled shader program exceeds the amount of time for the client device to compile the requested shader program, processing units performing method 700 may transmit a message to the client device that includes an instruction for the client device to compile the requested shader program.

At block 712, processing units performing method 700 may determine whether the requested compiled shader program is stored at a shader cache of the application. Processing units performing method 700 may determine whether the requested compiled shader program is stored at the shader cache by comparing the shader key and/or the shader value included with the received request with the shader key and/or shader value included in one or more entries in a data structure for the shader cache, such as shader cache data structure 316 described with respect to FIG. 3 and FIG. 4. In response to processing units performing method 700 determining that the compiled shader program is stored at the shader cache of the application, method 700 may continue to block 714. In response to processing units performing method 700 determining that the compiled shader program is not stored at the shader cache of the application, method 700 may continue to block 718.

As described previously, in some embodiments, system 150 may include one or more nodes that are configured to store one or more portions of the shader cache. In some embodiments, processing units performing method 700 may correspond to a shader cache engine that is running on a respective node. In such embodiments, processing units performing method 700 may determine whether the compiled shader program is stored at the portion of the shader cache associated with the respective node. In response to determining that the compiled shader program is stored at the portion of the shader cache associated with the respective node, processing units performing method 700 may retrieve the compiled shader program, in accordance with embodiments provided herein. In response to determining that the compiled shader program is not stored at the portion of the shader cache associated with the respective node, processing units performing method 700 may identify an additional node of system that includes a portion of the shader cache that stores the requested compiled shader program. Processing units performing method 700 may forward the request received from the client device to the identified additional node.

At block 714, processing units performing method 700 may retrieve the requested compiled shader program from the shader cache. In response to processing units performing method 700 identifying an entry of the shader cache data structure that corresponds to the shader key and/or shader value of the request, processing units performing method 400 may extract an address of the data store that stores the compiled shader program from the identified entry. Processing units performing method 700 may access the address extracted from the address and read data for the compiled shader program from the identified memory address. At block 716, processing units performing method 700 may transmit the compiled shader program to the client device.

At block 718, processing units performing method 700 may transmit a message to the client device indicating that the requested compiled shader program is not stored at the shader cache. At block 720, processing units performing method 700 may receive the compiled shader program from the client device. Processing units performing method 700 may also receive the shader key and associated with the client device and/or the shader value associated with the shader program, as described above.

At block 722, processing units performing method 700 may validate the received compiled shader program. Processing units performing method 700 may validate the received compiled shader program by determining whether the compiled shader program corresponds to an additional compiled shader program stored at a temporary buffer for the shader cache, such as temporary buffer 318 of FIG. 3. For example, processing units performing method 700 may compare the shader key associated with the client device to the shader keys of one or more entries of a temporary buffer data store, such as temporary buffer data structure 320. In an additional or alternative example, processing units performing method 700 may compare the shader key and/or shader value associated with the shader program to the shader keys and/or shader values of one or more entries of the temporary buffer data store. In response to identifying an entry of the temporary buffer data store that corresponds to the shader key and/or shader value of the request, processing units performing method 700 may determine whether the client device corresponds to a client device that has previously provided the compiled shader cache to shader cache engine 110. For example, processing units performing method 700 may compare an identifier of the client device to list of client device identifiers included in a client device identifier field of the data structure entry. The list of client device identifiers may include identifiers of each client device that has provided the compiled shader cache to shader cache engine 110. In response to processing units performing method 700 determining that the identifier of the client device corresponds to a respective client device identifier of the list of client device identifiers, method 700 may terminate.

In response to processing units performing method 700 determining that the identifier of the client device does not correspond to a respective client device identifier of the list of client device identifiers, processing units performing method 700 may update a counter value associated with the compiled shader program at the temporary buffer. Processing units performing method 700 may update the counter value by increasing a value of a counter associated with the identified entry of the temporary buffer data structure in view of the received compiled shader program. Processing units performing method 700 may determine whether the updated counter associated with the compiled shader program exceeds a threshold value. In response to processing units performing method 700 determining that the updated counter exceeds the threshold value, one or more operations associated with block 722 may terminate and processing units performing method 700 may consider the compiled shader program to be validated.

At block 724, processing units performing method 700 may store the received compiled shader program at the shader cache. Processing units performing method 700 may store the received compiled shader program at the shader cache by writing data associated with the compiled shader program to an available address of data store 112 associated with the shader cache. In some embodiments, processing units performing method 700 may erase the compiled shader program from the temporary buffer and, in some embodiments, may erase the entry associated with the compiled shader program from the temporary buffer data structure. Processing units performing method 700 may also add an entry to the shader cache data structure that corresponds to the compiled shader program.

FIG. 8 illustrates a flow diagram of an example method 800 of requesting a compiled shader program by a client device, according to at least some embodiments. In some embodiments, one or more operations of method 800 may be performed by one or more components or modules of shader manager 204, described herein. Processing units performing method 800 may detect, at block 810, that an application, or an instance of an application, running on the client device has referenced a particular shader program. At block 812, processing units performing method 800 may determine whether a compiled version of the referenced shader program is stored at memory (e.g., for the virtual system). In response to processing units performing method 800 determining that the compiled version of the referenced shader program is stored at the memory (e.g., for the virtual system), method 800 may proceed to block 814. At block 814, processing units performing method 800 may retrieve the compiled shader program from memory. At block 816, processing units performing method 800 may execute the compiled shader program, in accordance with the reference by the application.

In response to processing units performing method 800 determining that the compiled version of the referenced shader program is not stored at the memory (e.g., for the virtual system), method 800 may proceed to block 818. At block 818, processing units performing method 800 may transmit a request to an application hosting platform for the compiled shader program. At block 820, processing units performing method 800 may receive a message from the application hosting platform. At block 822, processing units performing method 800 may determine whether the received message includes the compiled shader program. In response to processing units performing method 800 determining that the received message includes the compiled shader program, processing units performing method 800 may proceed to block 822. At block 822, processing units performing method 800 may store the compiled shader program at virtual memory. In response to processing units performing method 800 storing the compiled shader program at virtual memory, method 800 may continue to block 816.

In response to processing units performing method 800 determining that the message received from the application hosting platform does not include the compiled shader program, method 800 may proceed to block 824. At block 824, processing units performing method 800 may compile the shader program locally. At block 826, processing units performing method 800 transmit the compiled shader program to the application hosting platform for storage at the shader cache, in accordance with embodiments described herein. In some embodiments, method 800 may continue to block 822, where processing units performing method 800 may store the compiled shader program at memory (e.g., for the virtual system).

Inference and Training Logic

Figure 9A:
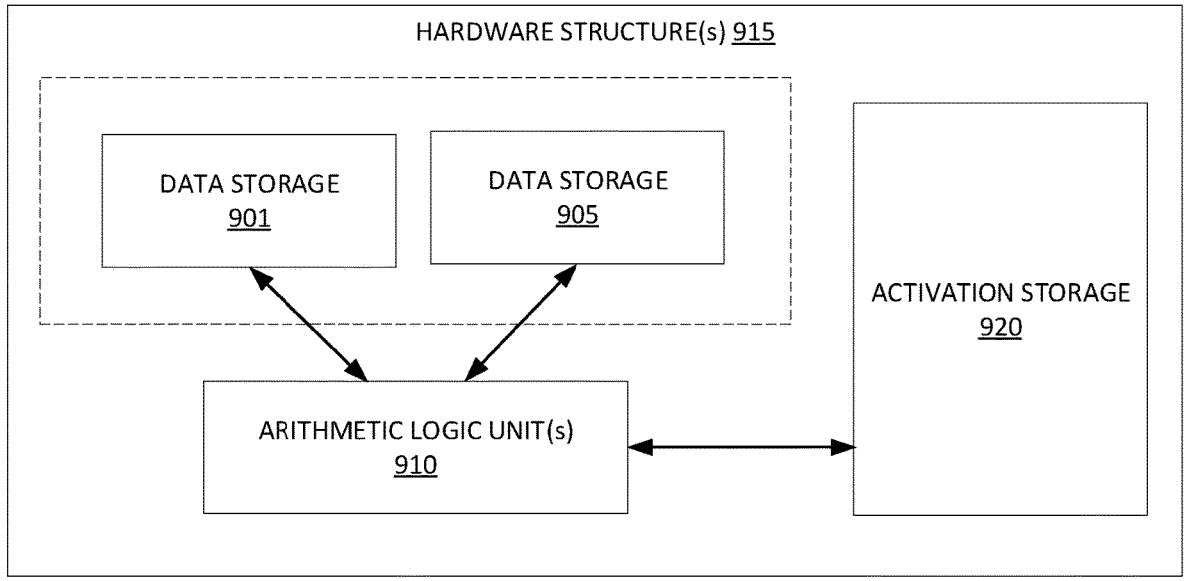
FIG. 9A illustrates inference and/or training logic, according to at least one embodiment.

FIG. 9A illustrates hardware structure(s) 915 for inference and/or training logic used to perform inferencing and/or training operations associated with one or more embodiments. Details regarding inference and/or training logic are provided below in conjunction with FIGS. 9A and/or 9B.

In at least one embodiment, hardware structure(s) 915 may include, without limitation, code and/or data storage 901 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 901 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 901 may be included with other on-chip or off-chip data storage, including a processor's L1, L2, or L3 cache or system memory.

In at least one embodiment, any portion of code and/or data storage 901 may be internal or external to one or more processors or other hardware logic devices or circuits. In at least one embodiment, code and/or code and/or data storage 901 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 901 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structure(s) 915 may include, without limitation, a code and/or data storage 905 to store backward and/or output weight and/or input/output data corresponding to neurons or layers of a neural network trained and/or used for inferencing in aspects of one or more embodiments. In at least one embodiment, code and/or data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 905 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 905 may be included with other on-chip or off-chip data storage, including a processor's L1, L2, or L3 cache or system memory. In at least one embodiment, any portion of code and/or data storage 905 may be internal or external to on one or more processors or other hardware logic devices or circuits. In at least one embodiment, code and/or data storage 905 may be cache memory, DRAM, SRAM, non-volatile memory (e.g., Flash memory), or other storage. In at least one embodiment, choice of whether code and/or data storage 905 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 901 and code and/or data storage 905 may be separate storage structures. In at least one embodiment, code and/or data storage 901 and code and/or data storage 905 may be same storage structure. In at least one embodiment, code and/or data storage 901 and code and/or data storage 905 may be partially same storage structure and partially separate storage structures. In at least one embodiment, any portion of code and/or data storage 901 and code and/or data storage 905 may be included with other on-chip or off-chip data storage, including a processor's L1, L2, or L3 cache or system memory.

In at least one embodiment, hardware structure(s) 915 may include, without limitation, one or more arithmetic logic unit(s) ("ALU(s)") 910, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 920 that are functions of input/output and/or weight parameter data stored in code and/or data storage 901 and/or code and/or data storage 905. In at least one embodiment, activations stored in activation storage 920 are generated according to linear algebraic and or matrix-based mathematics performed by ALU(s) 910 in response to performing instructions or other code, wherein weight values stored in code and/or data storage 905 and/or code and/or data storage 901 are used as operands along with other values, such as bias values, gradient information, momentum values, or other parameters or hyperparameters, any or all of which may be stored in code and/or data storage 905 or code and/or data storage 901 or another storage on or off-chip.

In at least one embodiment, ALU(s) 910 are included within one or more processors or other hardware logic devices or circuits, whereas in another embodiment, ALU(s) 910 may be external to a processor or other hardware logic device or circuit that uses them (e.g., a co-processor). In at least one embodiment, ALUs 910 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 901, code and/or data storage 905, and activation storage 920 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., Flash memory), or other storage. In at least one embodiment, activation storage 920 may be completely or partially within or external to one or more processors or other logical circuits. In at least one embodiment, choice of whether activation storage 920 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, hardware structure(s) 915 and/or inference and/or training logic described with respect to FIG. 9A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, hardware structure(s) and/or inference and/or training logic of FIG. 9A may be used in conjunction with central processing unit ("CPU") hardware, graphics processing unit ("GPU") hardware or other hardware, such as data processing unit ("DPU") hardware, or field programmable gate arrays ("FPGAs").

Figure 9B:
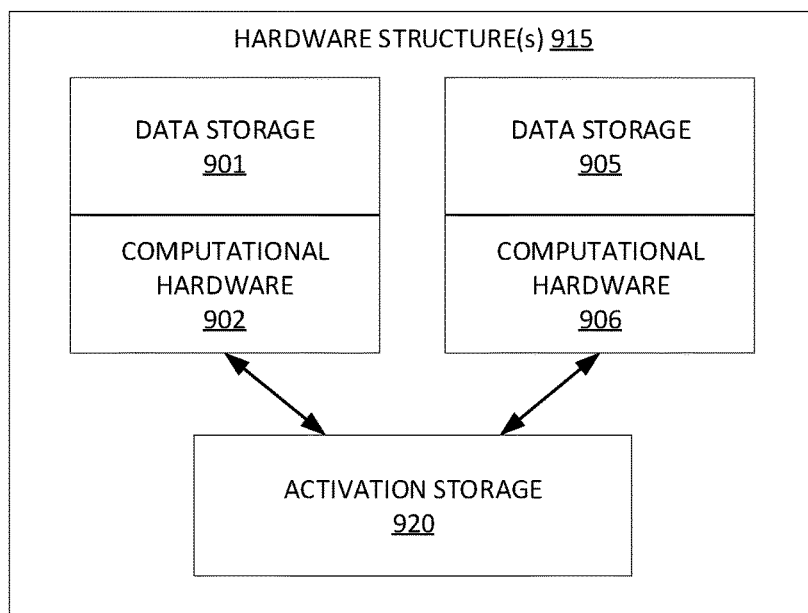
FIG. 9B illustrates inference and/or training logic, according to at least one embodiment.

FIG. 9B illustrates hardware structure(s) 915 for inference and/or training logic, according to at least one or more embodiments. In at least one embodiment, hardware structure(s) 915 may include, without limitation, hardware logic in which computational resources are dedicated or otherwise exclusively used in conjunction with weight values or other information corresponding to one or more layers of neurons within a neural network. In at least one embodiment, hardware structure(s) 915 and/or inference and/or training logic of FIG. 9B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, hardware structure(s) 915 and/or inference and/or training logic of FIG. 9B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic includes, without limitation, code and/or data storage 901 and code and/or data storage 905, which may be used to store code (e.g., graph code), weight values and/or other information, including bias values, gradient information, momentum values, and/or other parameter or hyperparameter information. In at least one embodiment illustrated in FIG. 9B, each of code and/or data storage 901 and code and/or data storage 905 is associated with a dedicated computational resource, such as computational hardware 902 and computational hardware 906, respectively. In at least one embodiment, each of computational hardware 902 and computational hardware 906 comprises one or more ALUs that perform mathematical functions, such as linear algebraic functions, only on information stored in code and/or data storage 901 and code and/or data storage 905, respectively, result of which is stored in activation storage 920.

In at least one embodiment, each of code and/or data storage 901 and 905 and corresponding computational hardware 902 and 906, respectively, correspond to different layers of a neural network, such that resulting activation from one "storage/computational pair 901/902" of code and/or data storage 901 and computational hardware 902 is provided as an input to "storage/computational pair 905/906" of code and/or data storage 905 and computational hardware 906, in order to mirror conceptual organization of a neural network. In at least one embodiment, each of storage/computational pairs 901/902 and 905/906 may correspond to more than one neural network layer. In at least one embodiment, additional storage/computation pairs (not shown) subsequent to or in parallel with storage computation pairs 901/902 and 905/906 may be included in inference and/or training logic.

Data Center

Figure 10:
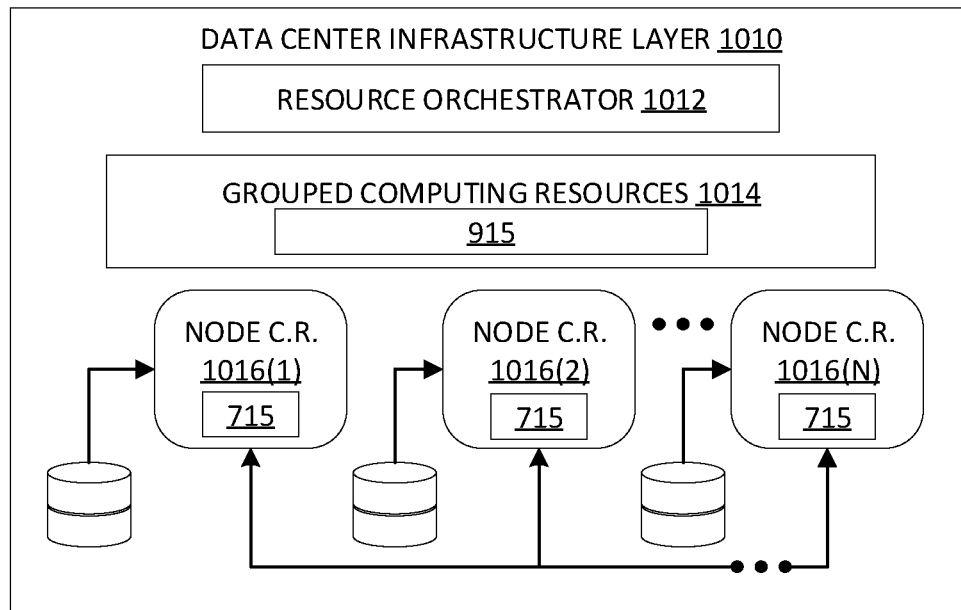
FIG. 10 illustrates an example data center system, according to at least one embodiment.

FIG. 10 illustrates an example data center 1000, in which at least one embodiment may be used. In at least one embodiment, data center 1000 includes a data center infrastructure layer 1010, a framework layer 1020, a software layer 1030, and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1012 may configure or otherwise control one or more node C.R.s 1016(1)-1016(N) and/or grouped computing resources 1014. In at least one embodiment, resource orchestrator 1012 may include a software design infrastructure ("SDI") management entity for data center 1000. In at least one embodiment, resource orchestrator may include hardware, software or some combination thereof.

In at least one embodiment, as shown in FIG. 10, framework layer 1020 includes a job scheduler 1022, a configuration manager 1024, a resource manager 1026 and a distributed file system 1028. In at least one embodiment, framework layer 1020 may include a framework to support software 1032 of software layer 1030 and/or one or more application(s) 1042 of application layer 1040. In at least one embodiment, software 1032 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1028 for large-scale data processing (e.g., "big data"). In at least one embodiment, job scheduler 1022 may include a Spark driver to facilitate scheduling of workloads supported by various layers of data center 1000. In at least one embodiment, configuration manager 1024 may be capable of configuring different layers such as software layer 1030 and framework layer 1020 including Spark and distributed file system 1028 for supporting large-scale data processing. In at least one embodiment, resource manager 1026 may be capable of managing clustered or grouped computing resources mapped to or allocated for support of distributed file system 1028 and job scheduler 1022. In at least one embodiment, clustered or grouped computing resources may include grouped computing resource 1014 at data center infrastructure layer 1010. In at least one embodiment, resource manager 1026 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1028 of framework layer 1020. The one or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1028 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1024, resource manager 1026, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

In at least one embodiment, data center 1000 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1000. In at least one embodiment, trained machine learning models corresponding to one or more neural networks may be used to infer or predict information using resources described above with respect to data center 1000 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 915 are used to perform inferencing and/or training operations associated with one or more embodiments. Details regarding inference and/or training logic 915 are provided below in conjunction with FIGS. 9A and/or 9B. In at least one embodiment, inference and/or training logic 915 may be used in system FIG. 10 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 11:
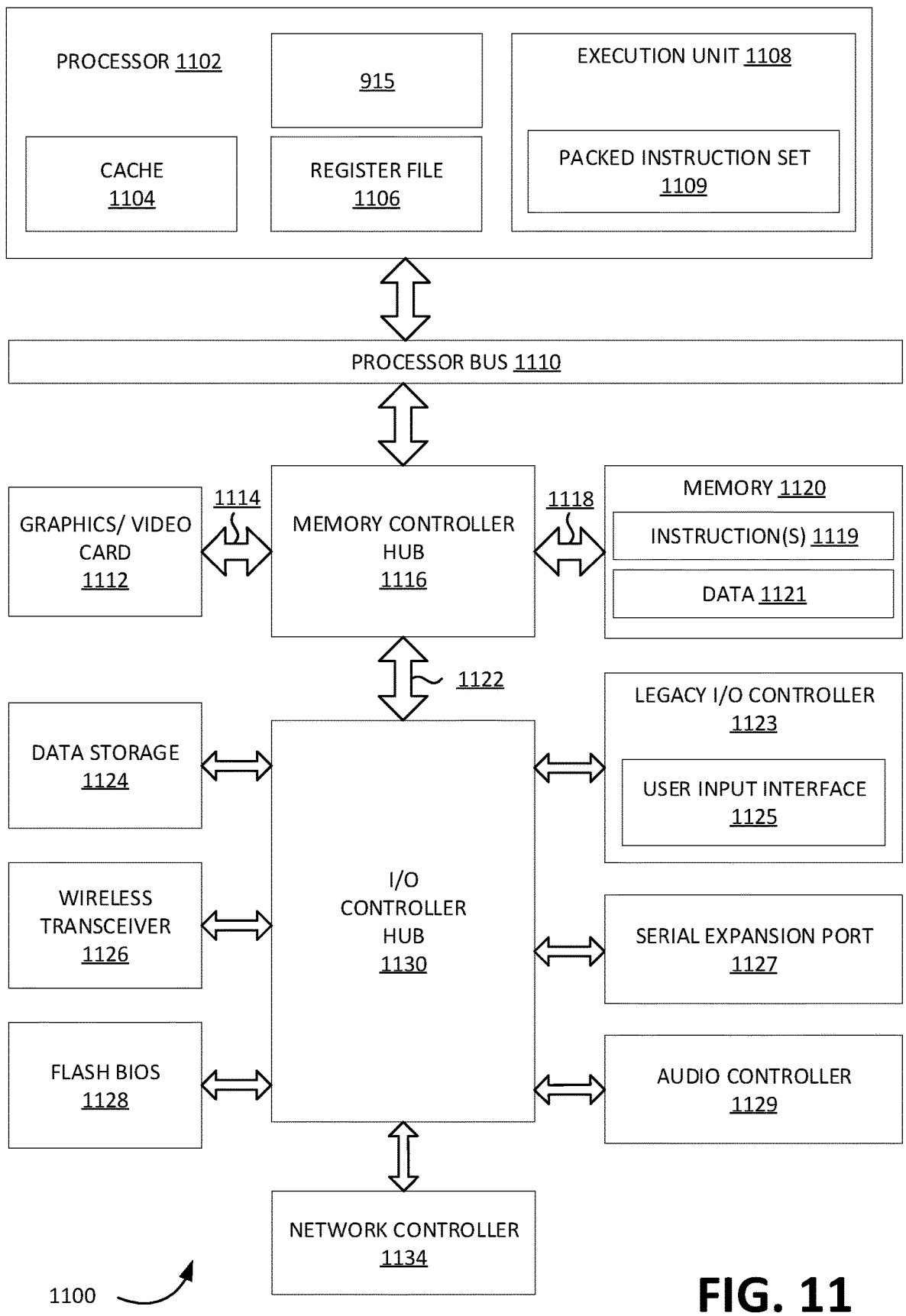
FIG. 11 illustrates a computer system, according to at least one embodiment.

FIG. 11 is a block diagram illustrating an exemplary computer system, which may be a system with interconnected devices and components, a system-on-a-chip (SOC) or some combination thereof 1100 formed with a processor that may include execution units to execute an instruction, according to at least one embodiment. In at least one embodiment, computer system 1100 may include, without limitation, a component, such as a processor 1102 to employ execution units including logic to perform algorithms for process data, in accordance with present disclosure, such as in embodiment described herein. In at least one embodiment, computer system 1100 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1100 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 1100 may include, without limitation, processor 1102 that may include, without limitation, one or more execution units 1108 to perform machine learning model training and/or inferencing according to techniques described herein. In at least one embodiment, computer system 1100 is a single processor desktop or server system, but in another embodiment computer system 1100 may be a multiprocessor system. In at least one embodiment, processor 1102 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. Other embodiments may also include a combination of both internal and external caches depending on particular implementation and needs. In at least one embodiment, register file 1106 may store different types of data in various registers including, without limitation, integer registers, floating point registers, status registers, and instruction pointer register.

In at least one embodiment, execution unit 1108, including, without limitation, logic to perform integer and floating point operations, also resides in processor 1102. In at least one embodiment, processor 1102 may also include a microcode ("ucode") read only memory ("ROM") that stores microcode for certain macro instructions. In at least one embodiment, execution unit 1108 may include logic to handle a packed instruction set 1109. In at least one embodiment, by including packed instruction set 1109 in an instruction set of a general-purpose processor 1102, along with associated circuitry to execute instructions, operations used by many multimedia applications may be performed using packed data in a general-purpose processor 1102. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1108 may also be used in microcontrollers, embedded processors, graphics devices, DSPs, and other types of logic circuits. In at least one embodiment, computer system 1100 may include, without limitation, a memory 1120. In at least one embodiment, memory 1120 may be implemented as a Dynamic Random Access Memory ("DRAM") device, a Static Random Access Memory ("SRAM") device, flash memory device, or other memory device. In at least one embodiment, memory 1120 may store instruction(s) 1119 and/or data 1121 represented by data signals that may be executed by processor 1102.

In at least one embodiment, system logic chip may be coupled to processor bus 1110 and memory 1120. In at least one embodiment, system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data and textures. In at least one embodiment, MCH 1116 may direct data signals between processor 1102, memory 1120, and other components in computer system 1100 and to bridge data signals between processor bus 1110, memory 1120, and a system I/O 1122. In at least one embodiment, system logic chip may provide a graphics port for coupling to a graphics controller. In at least one embodiment, MCH 1116 may be coupled to memory 1120 through a high bandwidth memory path 1118 and graphics/video card 1112 may be coupled to MCH 1116 through an Accelerated Graphics Port ("AGP") interconnect 1114.

In at least one embodiment, computer system 1100 may use system I/O 1122 that is a proprietary hub interface bus to couple MCH 1116 to I/O controller hub ("ICH") 1130. In at least one embodiment, ICH 1130 may provide direct connections to some I/O devices via a local I/O bus. In at least one embodiment, local I/O bus may include, without limitation, a high-speed I/O bus for connecting peripherals to memory 1120, chipset, and processor 1102. Examples may include, without limitation, an audio controller 1129, a firmware hub ("flash BIOS") 1128, a wireless transceiver 1126, a data storage 1124, a legacy I/O controller 1123 containing user input and keyboard interfaces 1125, a serial expansion port 1127, such as Universal Serial Bus ("USB"), and a network controller 1134, which may include in some embodiments, a data processing unit. Data storage 1124 may comprise a hard disk drive, a floppy disk drive, a CD-ROM device, a flash memory device, or other mass storage device.

In at least one embodiment, FIG. 11 illustrates a system, which includes interconnected hardware devices or "chips", whereas in other embodiments, FIG. 11 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1100 are interconnected using compute express link (CXL) interconnects.

Inference and/or training logic 915 are used to perform inferencing and/or training operations associated with one or more embodiments. Details regarding inference and/or training logic 915 are provided below in conjunction with FIGS. 9A and/or 9B. In at least one embodiment, inference and/or training logic 915 may be used in system FIG. 11 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 12:
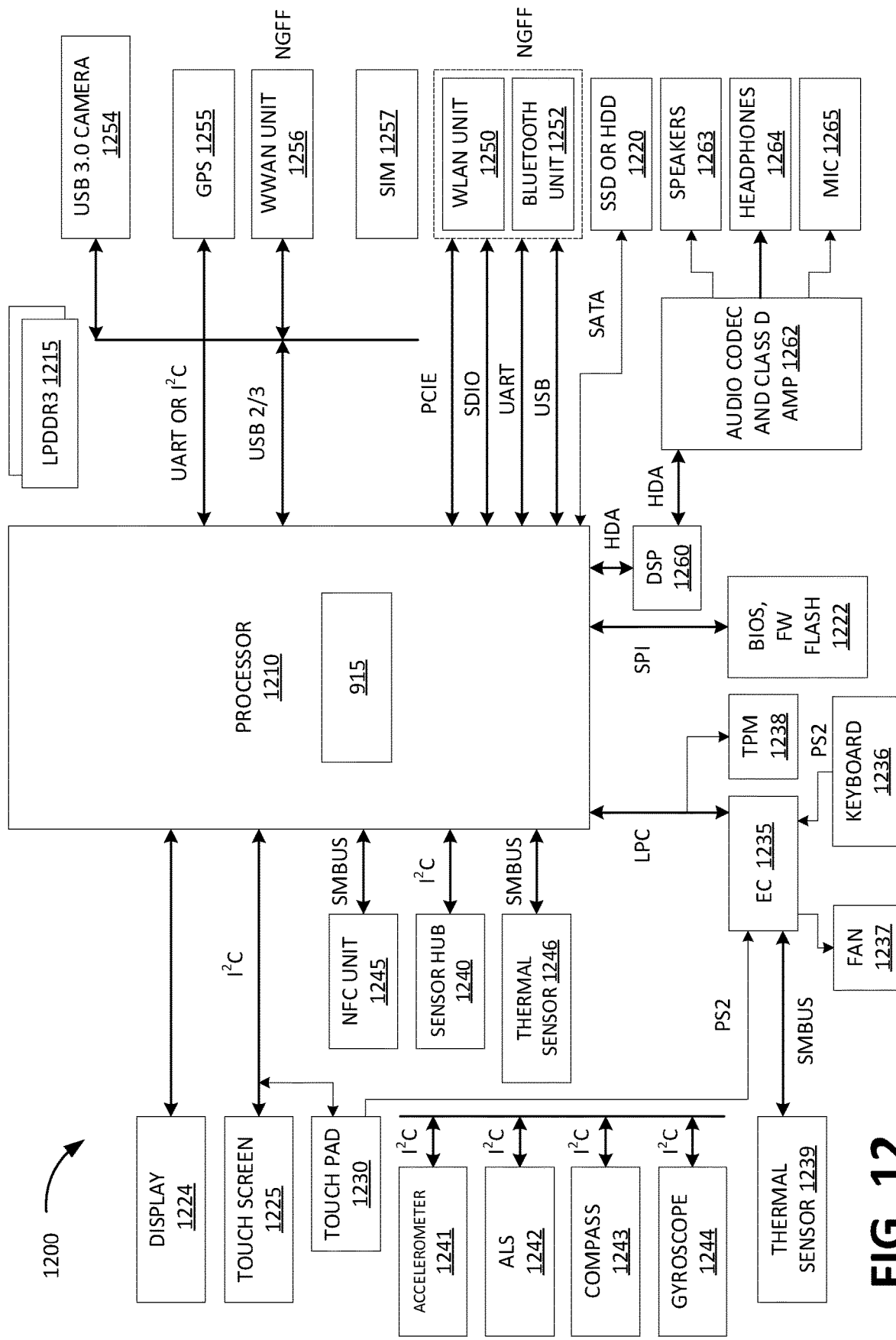
FIG. 12 illustrates a computer system, according to at least one embodiment.

FIG. 12 is a block diagram illustrating an electronic device 1200 for utilizing a processor 1210, according to at least one embodiment. In at least one embodiment, electronic device 1200 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1200 may include, without limitation, processor 1210 communicatively coupled to any suitable number or kind of components, peripherals, modules, or devices. In at least one embodiment, processor 1210 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 12 illustrates a system, which includes interconnected hardware devices or "chips", whereas in other embodiments, FIG. 12 may illustrate an exemplary System on a Chip ("SoC"). In at least one embodiment, devices illustrated in FIG. 12 may be interconnected with proprietary interconnects, standardized interconnects (e.g., PCIe) or some combination thereof. In at least one embodiment, one or more components of FIG. 12 are interconnected using compute express link (CXL) interconnects.

In at least one embodiment, FIG. 12 may include a display 1224, a touch screen 1225, a touch pad 1230, a Near Field Communications unit ("NFC") 1245, a sensor hub 1240, a thermal sensor 1246, an Express Chipset ("EC") 1235, a Trusted Platform Module ("TPM") 1238, BIOS/firmware/flash memory ("BIOS, FW Flash") 1222, a DSP 1260, a drive 1220 such as a Solid State Disk ("SSD") or a Hard Disk Drive ("HDD"), a wireless local area network unit ("WLAN") 1250, a Bluetooth unit 1252, a Wireless Wide Area Network unit ("WWAN") 1256, a Global Positioning System (GPS) 1255, a camera ("USB 3.0 camera") 1254 such as a USB 3.0 camera, and/or a Low Power Double Data Rate ("LPDDR") memory unit ("LPDDR3") 1215 implemented in, for example, LPDDR3 standard. These components may each be implemented in any suitable manner.

In at least one embodiment, other components may be communicatively coupled to processor 1210 through components discussed above. In at least one embodiment, an accelerometer 1241, Ambient Light Sensor ("ALS") 1242, compass 1243, and a gyroscope 1244 may be communicatively coupled to sensor hub 1240. In at least one embodiment, thermal sensor 1239, a fan 1237, a keyboard 1236, and a touch pad 1230 may be communicatively coupled to EC 1235. In at least one embodiment, speaker 1263, headphones 1264, and microphone ("mic") 1265 may be communicatively coupled to an audio unit ("audio codec and class d amp") 1262, which may in turn be communicatively coupled to DSP 1260. In at least one embodiment, audio unit 1264 may include, for example and without limitation, an audio coder/decoder ("codec") and a class D amplifier. In at least one embodiment, SIM card ("SIM") 1257 may be communicatively coupled to WWAN unit 1256. In at least one embodiment, components such as WLAN unit 1250 and Bluetooth unit 1252, as well as WWAN unit 1256 may be implemented in a Next Generation Form Factor ("NGFF").

Inference and/or training logic 915 are used to perform inferencing and/or training operations associated with one or more embodiments. Details regarding inference and/or training logic 915 are provided below in conjunction with FIGS. 9A and/or 9B. In at least one embodiment, inference and/or training logic 915 may be used in system FIG. 12 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 13:
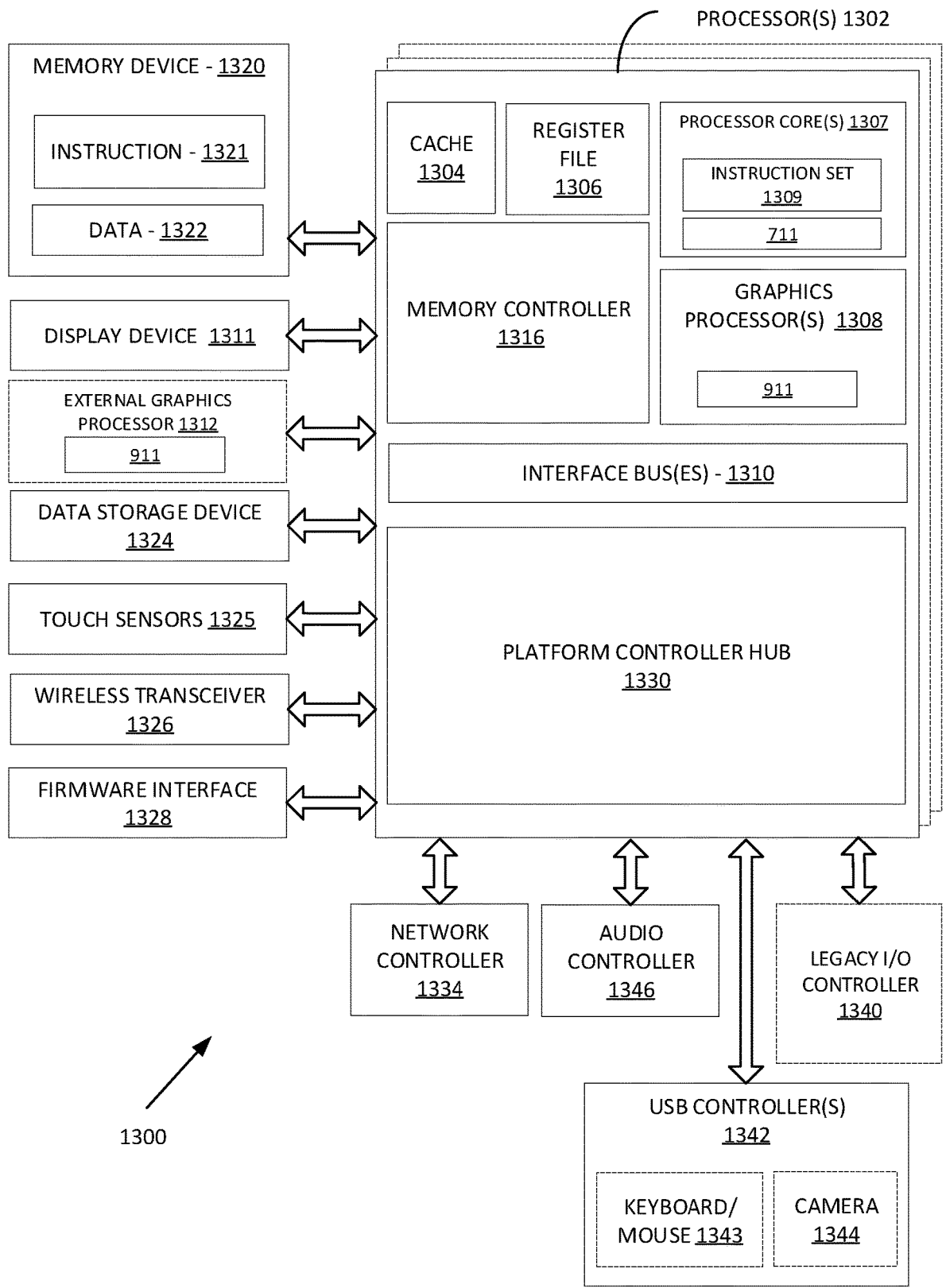
FIG. 13 illustrates at least portions of a graphics processor, according to one or more embodiments.

FIG. 13 is a block diagram of a processing system, according to at least one embodiment. In at least one embodiment, system 1300 includes one or more processors 1302 and one or more graphics processors 1308, and may be a single processor desktop system, a multiprocessor workstation system, or a server system having a large number of processors 1302 or processor cores 1307. In at least one embodiment, system 1300 is a processing platform incorporated within a system-on-a-chip (SoC) integrated circuit for use in mobile, handheld, edge, or embedded devices.

In at least one embodiment, system 1300 may include, or be incorporated within a server-based gaming platform, a game console, including a game and media console, a mobile gaming console, a handheld game console, or an online game console. In at least one embodiment, system 1300 is a mobile phone, smart phone, tablet computing device or mobile Internet device. In at least one embodiment, processing system 1300 may also include, couple with, or be integrated within a wearable device, such as a smart watch wearable device, smart eyewear device, augmented reality device, or virtual reality device. In at least one embodiment, processing system 1300 is a television or set top box device having one or more processors 1302 and a graphical interface generated by one or more graphics processors 1308.

In at least one embodiment, one or more processors 1302 each include one or more processor cores 1307 to process instructions which, when executed, perform operations for system and user software. In at least one embodiment, each of one or more processor cores 1307 is configured to process a specific instruction set 1309. In at least one embodiment, instruction set 1309 may facilitate Complex Instruction Set Computing (CISC), Reduced Instruction Set Computing (RISC), or computing via a Very Long Instruction Word (VLIW). In at least one embodiment, processor cores 1307 may each process a different instruction set 1309, which may include instructions to facilitate emulation of other instruction sets. In at least one embodiment, processor core 1307 may also include other processing devices, such a Digital Signal Processor (DSP).

In at least one embodiment, processor 1302 includes cache memory 1304. In at least one embodiment, processor 1302 may have a single internal cache or multiple levels of internal cache. In at least one embodiment, cache memory is shared among various components of processor 1302. In at least one embodiment, processor 1302 also uses an external cache (e.g., a Level-3 (L3) cache or Last Level Cache (LLC)) (not shown), which may be shared among processor cores 1307 using known cache coherency techniques. In at least one embodiment, register file 1306 is additionally included in processor 1302 which may include different types of registers for storing different types of data (e.g., integer registers, floating point registers, status registers, and an instruction pointer register). In at least one embodiment, register file 1306 may include general-purpose registers or other registers.

In at least one embodiment, one or more processor(s) 1302 are coupled with one or more interface bus(es) 1310 to transmit communication signals such as address, data, or control signals between processor 1302 and other components in system 1300. In at least one embodiment, interface bus 1310, in one embodiment, may be a processor bus, such as a version of a Direct Media Interface (DMI) bus. In at least one embodiment, interface 1310 is not limited to a DMI bus, and may include one or more Peripheral Component Interconnect buses (e.g., PCI, PCI Express), memory busses, or other types of interface busses. In at least one embodiment processor(s) 1302 include an integrated memory controller 1316 and a platform controller hub 1330. In at least one embodiment, memory controller 1316 facilitates communication between a memory device and other components of system 1300, while platform controller hub (PCH) 1330 provides connections to I/O devices via a local I/O bus.

In at least one embodiment, memory device 1320 may be a dynamic random access memory (DRAM) device, a static random access memory (SRAM) device, flash memory device, phase-change memory device, or some other memory device having suitable performance to serve as process memory. In at least one embodiment memory device 1320 may operate as system memory for system 1300, to store data 1322 and instructions 1321 for use when one or more processors 1302 executes an application or process. In at least one embodiment, memory controller 1316 also couples with an optional external graphics processor 1312, which may communicate with one or more graphics processors 1308 in processors 1302 to perform graphics and media operations. In at least one embodiment, a display device 1311 may connect to processor(s) 1302. In at least one embodiment display device 1311 may include one or more of an internal display device, as in a mobile electronic device or a laptop device or an external display device attached via a display interface (e.g., DisplayPort, etc.). In at least one embodiment, display device 1311 may include a head mounted display (HMD) such as a stereoscopic display device for use in virtual reality (VR) applications or augmented reality (AR) applications.

In at least one embodiment, platform controller hub 1330 enables peripherals to connect to memory device 1320 and processor 1302 via a high-speed I/O bus. In at least one embodiment, I/O peripherals include, but are not limited to, an audio controller 1346, a network controller 1334, a firmware interface 1328, a wireless transceiver 1326, touch sensors 1325, a data storage device 1324 (e.g., hard disk drive, flash memory, etc.). In at least one embodiment, data storage device 1324 may connect via a storage interface (e.g., SATA) or via a peripheral bus, such as a Peripheral Component Interconnect bus (e.g., PCI, PCI Express). In at least one embodiment, touch sensors 1325 may include touch screen sensors, pressure sensors, or fingerprint sensors. In at least one embodiment, wireless transceiver 1326 may be a Wi-Fi transceiver, a Bluetooth transceiver, or a mobile network transceiver such as a 3G, 4G, or Long Term Evolution (LTE) transceiver. In at least one embodiment, firmware interface 1328 enables communication with system firmware, and may be, for example, a unified extensible firmware interface (UEFI). In at least one embodiment, network controller 1334 may enable a network connection to a wired network. In at least one embodiment, a high-performance network controller (not shown) couples with interface bus 1310. In at least one embodiment, audio controller 1346 is a multi-channel high definition audio controller. In at least one embodiment, system 1300 includes an optional legacy I/O controller 1340 for coupling legacy (e.g., Personal System 2 (PS/2)) devices to system. In at least one embodiment, platform controller hub 1330 may also connect to one or more Universal Serial Bus (USB) controllers 1342 connect input devices, such as keyboard and mouse 1343 combinations, a camera 1344, or other USB input devices.

In at least one embodiment, an instance of memory controller 1316 and platform controller hub 1330 may be integrated into a discreet external graphics processor, such as external graphics processor 1312. In at least one embodiment, platform controller hub 1330 and/or memory controller 1316 may be external to one or more processor(s) 1302. For example, in at least one embodiment, system 1300 may include an external memory controller 1316 and platform controller hub 1330, which may be configured as a memory controller hub and peripheral controller hub within a system chipset that is in communication with processor(s) 1302.

Inference and/or training logic are used to perform inferencing and/or training operations associated with one or more embodiments. Details regarding inference and/or training logic are provided in conjunction with FIGS. 9A and/or 9B. In at least one embodiment portions or all of inference and/or training logic may be incorporated into graphics processor 1400. For example, in at least one embodiment, training and/or inferencing techniques described herein may use one or more of ALUs embodied in a graphics processor. Moreover, in at least one embodiment, inferencing and/or training operations described herein may be done using logic other than logic described with respect to FIG. 9A or 9B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 14:
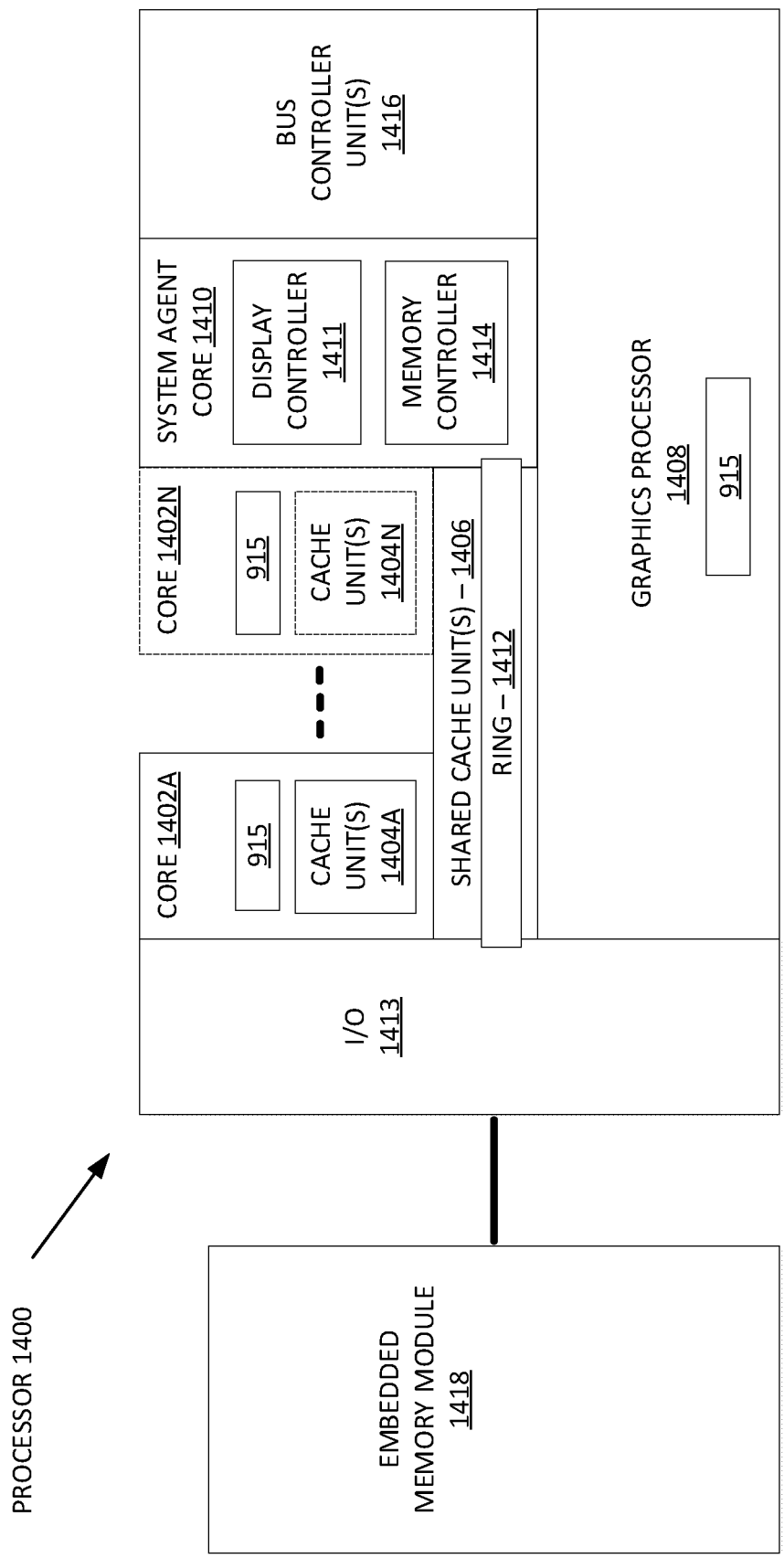
FIG. 14 illustrates at least portions of a graphics processor, according to one or more embodiments.

FIG. 14 is a block diagram of a processor 1400 having one or more processor cores 1402A-1402N, an integrated memory controller 1414, and an integrated graphics processor 1408, according to at least one embodiment. In at least one embodiment, processor 1400 may include additional cores up to and including additional core 1402N represented by dashed lined boxes. In at least one embodiment, each of processor cores 1402A-1402N includes one or more internal cache units 1404A-1404N. In at least one embodiment, each processor core also has access to one or more shared cached units 1406.

In at least one embodiment, internal cache units 1404A-1404N and shared cache units 1406 represent a cache memory hierarchy within processor 1400. In at least one embodiment, cache memory units 1404A-1404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1406 and 1404A-1404N.

In at least one embodiment, processor 1400 may also include a set of one or more bus controller units 1416 and a system agent core 1410. In at least one embodiment, one or more bus controller units 1416 manage a set of peripheral buses, such as one or more PCI or PCI express busses. In at least one embodiment, system agent core 1410 provides management functionality for various processor components. In at least one embodiment, system agent core 1410 includes one or more integrated memory controllers 1414 to manage access to various external memory devices (not shown).

In at least one embodiment, one or more of processor cores 1402A-1402N include support for simultaneous multi-threading. In at least one embodiment, system agent core 1410 includes components for coordinating and operating cores 1402A-1402N during multi-threaded processing. In at least one embodiment, system agent core 1410 may additionally include a power control unit (PCU), which includes logic and components to regulate one or more power states of processor cores 1402A-1402N and graphics processor 1408.

In at least one embodiment, processor 1400 additionally includes graphics processor 1408 to execute graphics processing operations. In at least one embodiment, graphics processor 1408 couples with shared cache units 1406, and system agent core 1410, including one or more integrated memory controllers 1414. In at least one embodiment, system agent core 1410 also includes a display controller 1411 to drive graphics processor output to one or more coupled displays. In at least one embodiment, display controller 1411 may also be a separate module coupled with graphics processor 1408 via at least one interconnect, or may be integrated within graphics processor 1408.

In at least one embodiment, a ring based interconnect unit 1412 is used to couple internal components of processor 1400. In at least one embodiment, an alternative interconnect unit may be used, such as a point-to-point interconnect, a switched interconnect, or other techniques. In at least one embodiment, graphics processor 1408 couples with ring interconnect 1412 via an I/O link 1413.

In at least one embodiment, I/O link 1413 represents at least one of multiple varieties of I/O interconnects, including an on package I/O interconnect which facilitates communication between various processor components and a high-performance embedded memory module 1418, such as an eDRAM module. In at least one embodiment, each of processor cores 1402A-1402N and graphics processor 1408 use embedded memory modules 1418 as a shared Last Level Cache.

In at least one embodiment, processor cores 1402A-1402N are homogenous cores executing a common instruction set architecture. In at least one embodiment, processor cores 1402A-1402N are heterogeneous in terms of instruction set architecture (ISA), where one or more of processor cores 1402A-1402N execute a common instruction set, while one or more other cores of processor cores 1402A-1402N executes a subset of a common instruction set or a different instruction set. In at least one embodiment, processor cores 1402A-1402N are heterogeneous in terms of microarchitecture, where one or more cores having a relatively higher power consumption couple with one or more power cores having a lower power consumption. In at least one embodiment, processor 1400 may be implemented on one or more chips or as an SoC integrated circuit.

Inference and/or training logic 915 are used to perform inferencing and/or training operations associated with one or more embodiments. Details regarding inference and/or training logic 915 are provided below in conjunction with FIGS. 9A and/or 9B. In at least one embodiment portions or all of inference and/or training logic 915 may be incorporated into processor 1400. For example, in at least one embodiment, training and/or inferencing techniques described herein may use one or more of ALUs embodied in graphics processor 1408, graphics core(s) 1402A-1402N, or other components in FIG. 14. Moreover, in at least one embodiment, inferencing and/or training operations described herein may be done using logic other than logic illustrated in FIG. 9A or 9B. In at least one embodiment, weight parameters may be stored in on-chip or off-chip memory and/or registers (shown or not shown) that configure ALUs of graphics processor 1400 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 15:
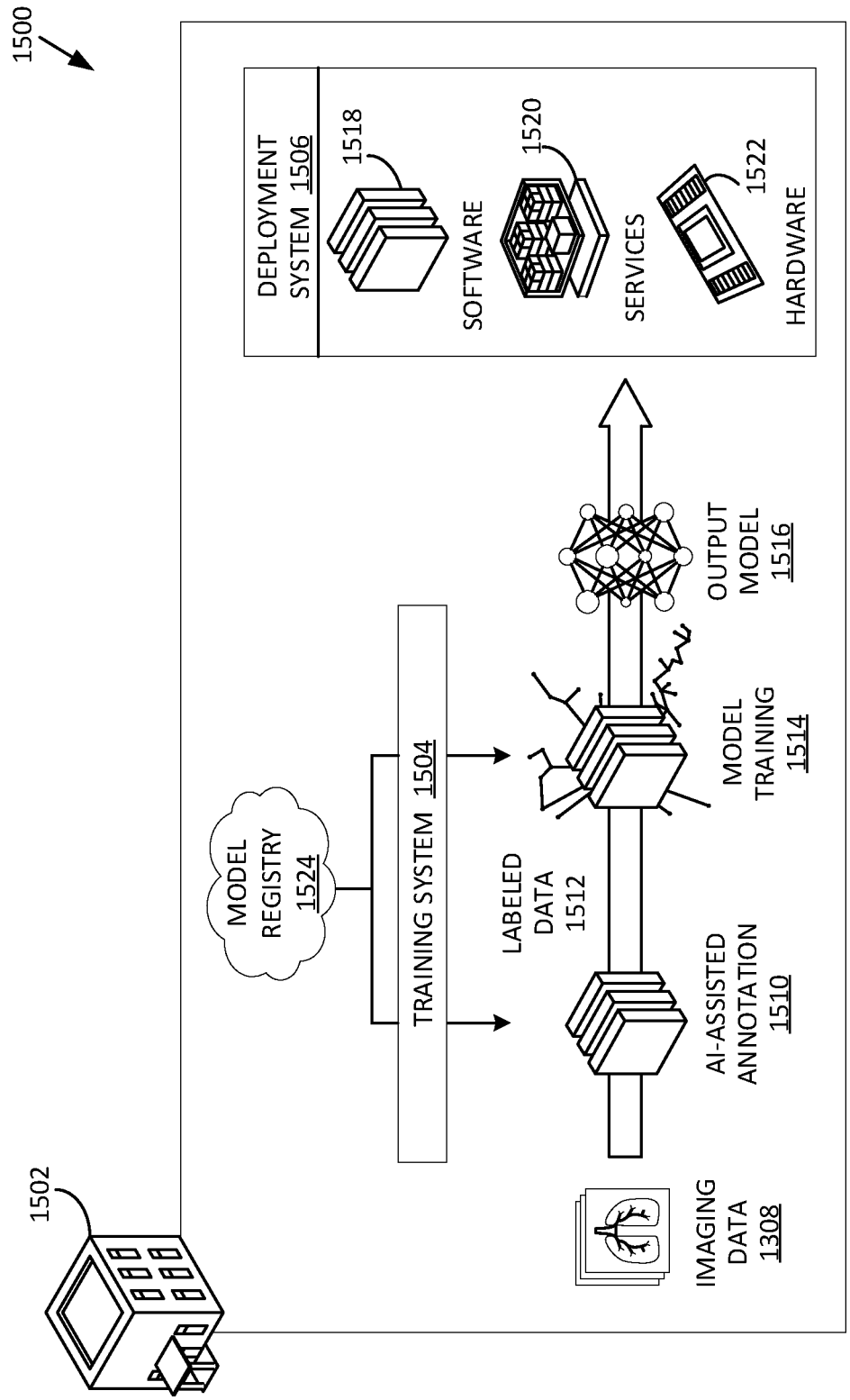
FIG. 15 is an example data flow diagram for an advanced computing pipeline, in accordance with at least one embodiment.

FIG. 15 is an example data flow diagram for a process 1500 of generating and deploying an image processing and inferencing pipeline, in accordance with at least one embodiment. In at least one embodiment, process 1500 may be deployed for use with imaging devices, processing devices, and/or other device types at one or more facilities 1502. Process 1500 may be executed within a training system 1504 and/or a deployment system 1506. In at least one embodiment, training system 1504 may be used to perform training, deployment, and implementation of machine learning models (e.g., neural networks, object detection algorithms, computer vision algorithms, etc.) for use in deployment system 1506. In at least one embodiment, deployment system 1506 may be configured to offload processing and compute resources among a distributed computing environment to reduce infrastructure requirements at facility 1502. In at least one embodiment, one or more applications in a pipeline may use or call upon services (e.g., inference, visualization, compute, AI, etc.) of deployment system 1506 during execution of applications.

In at least one embodiment, some of applications used in advanced processing and inferencing pipelines may use machine learning models or other AI to perform one or more processing steps. In at least one embodiment, machine learning models may be trained at facility 1502 using data 1508 (such as imaging data) generated at facility 1502 (and stored on one or more picture archiving and communication system (PACS) servers at facility 1502), may be trained using imaging or sequencing data 1508 from another facility(ies), or a combination thereof. In at least one embodiment, training system 1504 may be used to provide applications, services, and/or other resources for generating working, deployable machine learning models for deployment system 1506.

In at least one embodiment, model registry 1524 may be backed by object storage that may support versioning and object metadata. In at least one embodiment, object storage may be accessible through, for example, a cloud storage (e.g., cloud 1626 of FIG. 16) compatible application programming interface (API) from within a cloud platform. In at least one embodiment, machine learning models within model registry 1524 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1604 (FIG. 16) may include a scenario where facility 1502 is training their own machine learning model, or has an existing machine learning model that needs to be optimized or updated. In at least one embodiment, imaging data 1508 generated by imaging device(s), sequencing devices, and/or other device types may be received. In at least one embodiment, once imaging data 1508 is received, AI-assisted annotation 1510 may be used to aid in generating annotations corresponding to imaging data 1508 to be used as ground truth data for a machine learning model. In at least one embodiment, AI-assisted annotation 1510 may include one or more machine learning models (e.g., convolutional neural networks (CNNs)) that may be trained to generate annotations corresponding to certain types of imaging data 1508 (e.g., from certain devices). In at least one embodiment, AI-assisted annotations 1510 may then be used directly, or may be adjusted or fine-tuned using an annotation tool to generate ground truth data. In at least one embodiment, AI-assisted annotations 1510, labeled clinic data 1512, or a combination thereof may be used as ground truth data for training a machine learning model. In at least one embodiment, a trained machine learning model may be referred to as output model 1516, and may be used by deployment system 1506, as described herein.

In at least one embodiment, training pipeline 1604 (FIG. 16) may include a scenario where facility 1502 needs a machine learning model for use in performing one or more processing tasks for one or more applications in deployment system 1506, but facility 1502 may not currently have such a machine learning model (or may not have a model that is optimized, efficient, or effective for such purposes). In at least one embodiment, an existing machine learning model may be selected from a model registry 1524. In at least one embodiment, model registry 1524 may include machine learning models trained to perform a variety of different inference tasks on imaging data. In at least one embodiment, machine learning models in model registry 1524 may have been trained on imaging data from different facilities than facility 1502 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1524. In at least one embodiment, a machine learning model may then be retrained, or updated, at any number of other facilities, and a retrained or updated model may be made available in model registry 1524. In at least one embodiment, a machine learning model may then be selected from model registry 1524—and referred to as output model 1516—and may be used in deployment system 1506 to perform one or more processing tasks for one or more applications of a deployment system.

In at least one embodiment, training pipeline 1604 (FIG. 16), a scenario may include facility 1502 requiring a machine learning model for use in performing one or more processing tasks for one or more applications in deployment system 1506, but facility 1502 may not currently have such a machine learning model (or may not have a model that is optimized, efficient, or effective for such purposes). In at least one embodiment, a machine learning model selected from model registry 1524 may not be fine-tuned or optimized for imaging data 1508 generated at facility 1502 because of differences in populations, robustness of training data used to train a machine learning model, diversity in anomalies of training data, and/or other issues with training data. In at least one embodiment, AI-assisted annotation 1510 may be used to aid in generating annotations corresponding to imaging data 1508 to be used as ground truth data for retraining or updating a machine learning model. In at least one embodiment, labeled data 1512 may be used as ground truth data for training a machine learning model. In at least one embodiment, retraining or updating a machine learning model may be referred to as model training 1514. In at least one embodiment, model training 1514—e.g., AI-assisted annotations 1510, labeled clinic data 1512, or a combination thereof—may be used as ground truth data for retraining or updating a machine learning model. In at least one embodiment, a trained machine learning model may be referred to as output model 1516, and may be used by deployment system 1506, as described herein.

In at least one embodiment, deployment system 1506 may include software 1518, services 1520, hardware 1522, and/or other components, features, and functionality. In at least one embodiment, deployment system 1506 may include a software "stack," such that software 1518 may be built on top of services 1520 and may use services 1520 to perform some or all of processing tasks, and services 1520 and software 1518 may be built on top of hardware 1522 and use hardware 1522 to execute processing, storage, and/or other compute tasks of deployment system 1506. In at least one embodiment, software 1518 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1508, in addition to containers that receive and configure imaging data for use by each container and/or for use by facility 1502 after processing through a pipeline (e.g., to convert outputs back to a usable data type). In at least one embodiment, a combination of containers within software 1518 (e.g., that make up a pipeline) may be referred to as a virtual instrument (as described in more detail herein), and a virtual instrument may leverage services 1520 and hardware 1522 to execute some or all processing tasks of applications instantiated in containers.

In at least one embodiment, a data processing pipeline may receive input data (e.g., imaging data 1508) in a specific format in response to an inference request (e.g., a request from a user of deployment system 1506). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1516 of training system 1504.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1524 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1520 as a system (e.g., system 1600 of FIG. 16). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1600 (e.g., for accuracy), an application may be available in a container registry for selection and/or implementation by a user to perform one or more processing tasks with respect to data at a facility (e.g., a second facility) of a user.

Figure 16:
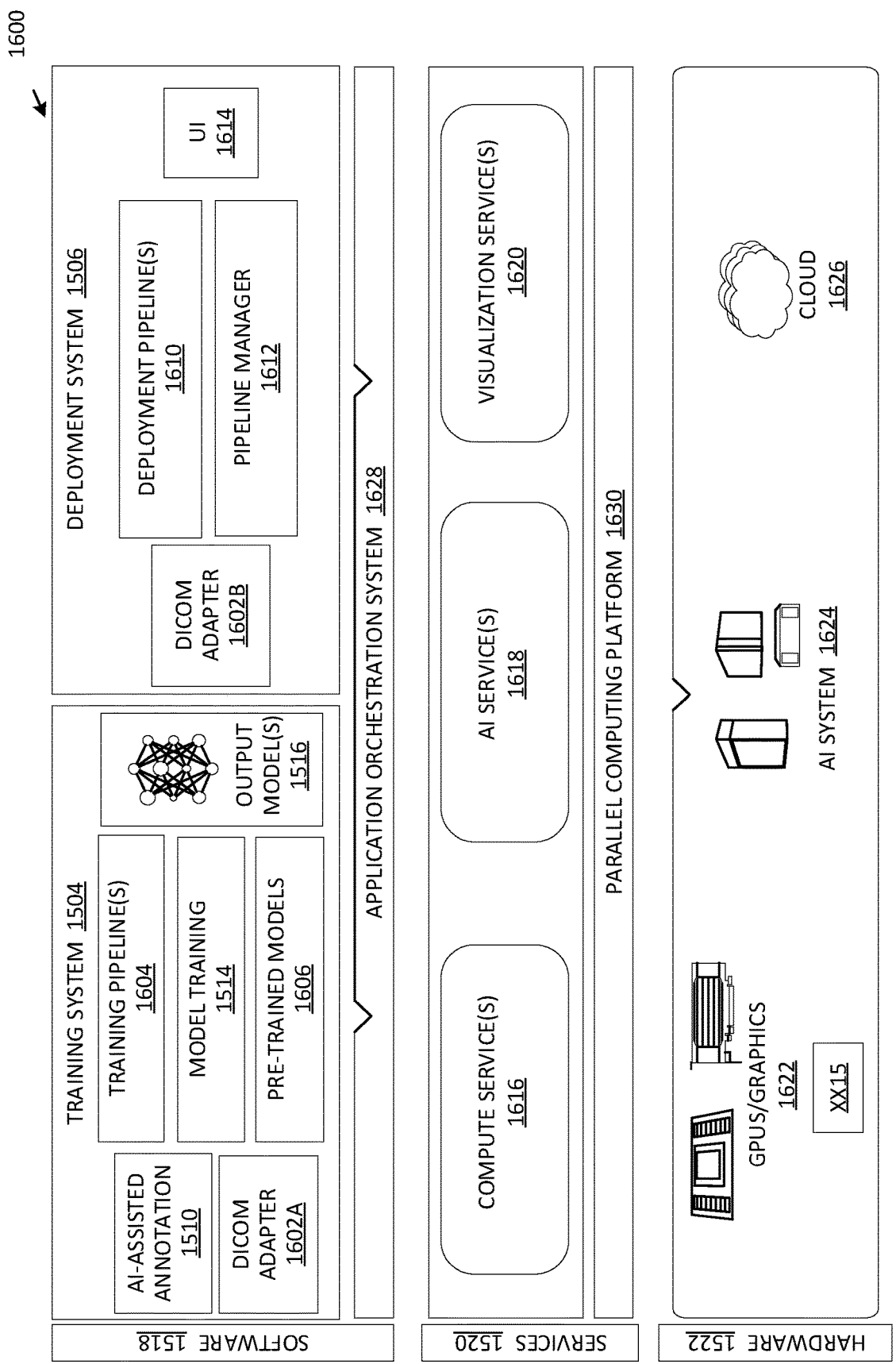
FIG. 16 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1600 of FIG. 16). In at least one embodiment, completed and validated applications or containers may be stored in a container registry and associated machine learning models may be stored in model registry 1524. In at least one embodiment, a requesting entity—who provides an inference or image processing request—may browse a container registry and/or model registry 1524 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1506 (e.g., a cloud) to perform processing of data processing pipeline. In at least one embodiment, processing by deployment system 1506 may include referencing selected elements (e.g., applications, containers, models, etc.) from a container registry and/or model registry 1524. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1520 may be leveraged. In at least one embodiment, services 1520 may include compute services, artificial intelligence (AI) services, visualization services, and/or other service types. In at least one embodiment, services 1520 may provide functionality that is common to one or more applications in software 1518, so functionality may be abstracted to a service that may be called upon or leveraged by applications. In at least one embodiment, functionality provided by services 1520 may run dynamically and more efficiently, while also scaling well by allowing applications to process data in parallel (e.g., using a parallel computing platform 1630 (FIG. 16)). In at least one embodiment, rather than each application that shares a same functionality offered by a service 1520 being required to have a respective instance of service 1520, service 1520 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1520 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1518 implementing advanced processing and inferencing pipeline that includes segmentation application and anomaly detection application may be streamlined because each application may call upon a same inference service to perform one or more inferencing tasks.

In at least one embodiment, hardware 1522 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1522 may be used to provide efficient, purpose-built support for software 1518 and services 1520 in deployment system 1506. In at least one embodiment, use of GPU processing may be implemented for processing locally (e.g., at facility 1502), within an AI/deep learning system, in a cloud system, and/or in other processing components of deployment system 1506 to improve efficiency, accuracy, and efficacy of image processing and generation. In at least one embodiment, software 1518 and/or services 1520 may be optimized for GPU processing with respect to deep learning, machine learning, and/or high-performance computing, as non-limiting examples. In at least one embodiment, at least some of computing environment of deployment system 1506 and/or training system 1504 may be executed in a datacenter one or more supercomputers or high performance computing systems, with GPU optimized software (e.g., hardware and software combination of NVIDIA's DGX System). In at least one embodiment, hardware 1522 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 16 is a system diagram for an example system 1600 for generating and deploying an imaging deployment pipeline, in accordance with at least one embodiment. In at least one embodiment, system 1600 may be used to implement process 1500 of FIG. 15 and/or other processes including advanced processing and inferencing pipelines. In at least one embodiment, system 1600 may include training system 1504 and deployment system 1506. In at least one embodiment, training system 1504 and deployment system 1506 may be implemented using software 1518, services 1520, and/or hardware 1522, as described herein.

In at least one embodiment, system 1600 (e.g., training system 1504 and/or deployment system 1506) may implemented in a cloud computing environment (e.g., using cloud 1626). In at least one embodiment, system 1600 may be implemented locally with respect to a healthcare services facility, or as a combination of both cloud and local computing resources. In at least one embodiment, access to APIs in cloud 1626 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1600, may be restricted to a set of public IPs that have been vetted or authorized for interaction.

In at least one embodiment, various components of system 1600 may communicate between and among one another using any of a variety of different network types, including but not limited to local area networks (LANs) and/or wide area networks (WANs) via wired and/or wireless communication protocols. In at least one embodiment, communication between facilities and components of system 1600 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1504 may execute training pipelines 1604, similar to those described herein with respect to FIG. 15. In at least one embodiment, where one or more machine learning models are to be used in deployment pipelines 1610 by deployment system 1506, training pipelines 1604 may be used to train or retrain one or more (e.g. pre-trained) models, and/or implement one or more of pre-trained models 1606 (e.g., without a need for retraining or updating). In at least one embodiment, as a result of training pipelines 1604, output model(s) 1516 may be generated. In at least one embodiment, training pipelines 1604 may include any number of processing steps, such as but not limited to imaging data (or other input data) conversion or adaption In at least one embodiment, for different machine learning models used by deployment system 1506, different training pipelines 1604 may be used. In at least one embodiment, training pipeline 1604 similar to a first example described with respect to FIG. 15 may be used for a first machine learning model, training pipeline 1604 similar to a second example described with respect to FIG. 15 may be used for a second machine learning model, and training pipeline 1604 similar to a third example described with respect to FIG. 15 may be used for a third machine learning model. In at least one embodiment, any combination of tasks within training system 1504 may be used depending on what is required for each respective machine learning model. In at least one embodiment, one or more of machine learning models may already be trained and ready for deployment so machine learning models may not undergo any processing by training system 1504, and may be implemented by deployment system 1506.

In at least one embodiment, output model(s) 1516 and/or pre-trained model(s) 1606 may include any types of machine learning models depending on implementation or embodiment. In at least one embodiment, and without limitation, machine learning models used by system 1600 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 17A:
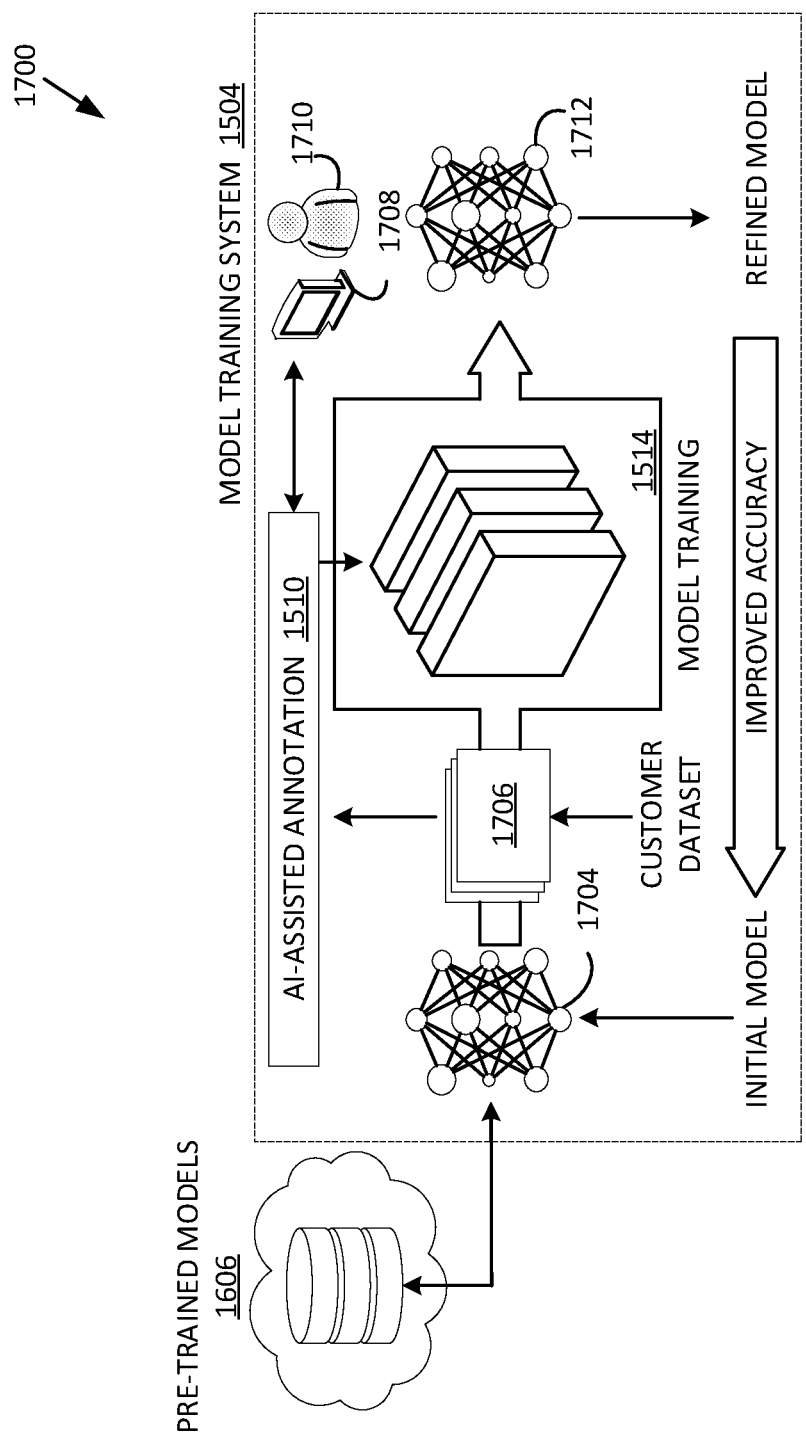
FIGS. 17A and 17B illustrate a data flow diagram for a process to train a machine learning model, as well as client-server architecture to enhance annotation tools with pre-trained annotation models, in accordance with at least one embodiment.
Figure 17B:
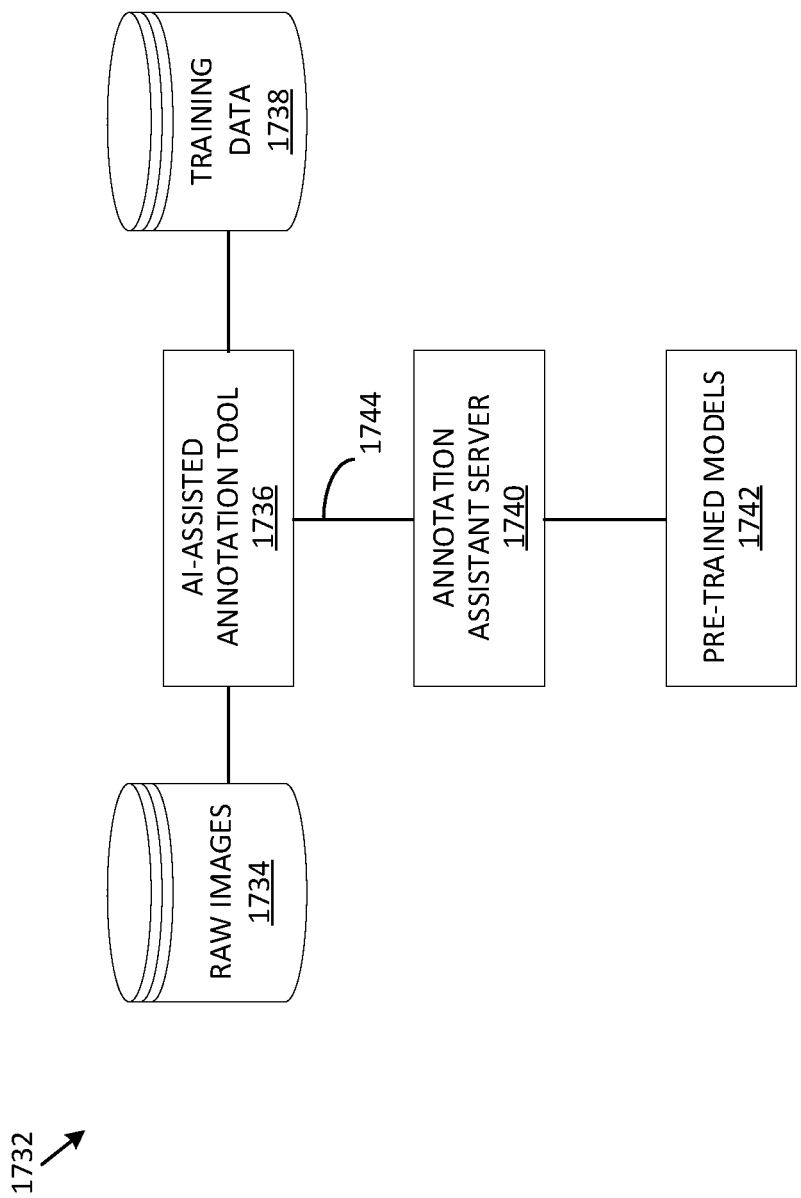

In at least one embodiment, training pipelines 1604 may include AI-assisted annotation, as described in more detail herein with respect to at least FIG. 17B. In at least one embodiment, labeled data 1512 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1508 (or other data type used by machine learning models), there may be corresponding ground truth data generated by training system 1504. In at least one embodiment, AI-assisted annotation may be performed as part of deployment pipelines 1610; either in addition to, or in lieu of AI-assisted annotation included in training pipelines 1604. In at least one embodiment, system 1600 may include a multi-layer platform that may include a software layer (e.g., software 1518) of diagnostic applications (or other application types) that may perform one or more medical imaging and diagnostic functions. In at least one embodiment, system 1600 may be communicatively coupled to (e.g., via encrypted links) PACS server networks of one or more facilities. In at least one embodiment, system 1600 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1502). In at least one embodiment, applications may then call or execute one or more services 1520 for performing compute, AI, or visualization tasks associated with respective applications, and software 1518 and/or services 1520 may leverage hardware 1522 to perform processing tasks in an effective and efficient manner.

In at least one embodiment, deployment system 1506 may execute deployment pipelines 1610. In at least one embodiment, deployment pipelines 1610 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline 1610 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1610 depending on information desired from data generated by a device. In at least one embodiment, where detections of anomalies are desired from an MRI machine, there may be a first deployment pipeline 1610, and where image enhancement is desired from output of an MRI machine, there may be a second deployment pipeline 1610.

In at least one embodiment, an image generation application may include a processing task that includes use of a machine learning model. In at least one embodiment, a user may desire to use their own machine learning model, or to select a machine learning model from model registry 1524. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1600— such as services 1520 and hardware 1522—deployment pipelines 1610 may be even more user friendly, provide for easier integration, and produce more accurate, efficient, and timely results.

In at least one embodiment, deployment system 1506 may include a user interface 1614 (e.g., a graphical user interface, a web interface, etc.) that may be used to select applications for inclusion in deployment pipeline(s) 1610, arrange applications, modify, or change applications or parameters or constructs thereof, use and interact with deployment pipeline(s) 1610 during set-up and/or deployment, and/or to otherwise interact with deployment system 1506. In at least one embodiment, although not illustrated with respect to training system 1504, user interface 1614 (or a different user interface) may be used for selecting models for use in deployment system 1506, for selecting models for training, or retraining, in training system 1504, and/or for otherwise interacting with training system 1504.

In at least one embodiment, pipeline manager 1612 may be used, in addition to an application orchestration system 1628, to manage interaction between applications or containers of deployment pipeline(s) 1610 and services 1520 and/or hardware 1522. In at least one embodiment, pipeline manager 1612 may be configured to facilitate interactions from application to application, from application to service 1520, and/or from application or service to hardware 1522. In at least one embodiment, although illustrated as included in software 1518, this is not intended to be limiting, and in some examples (e.g., as illustrated in FIG. 14) pipeline manager 1612 may be included in services 1520. In at least one embodiment, application orchestration system 1628 (e.g., Kubernetes, DOCKER, etc.) may include a container orchestration system that may group applications into containers as logical units for coordination, management, scaling, and deployment. In at least one embodiment, by associating applications from deployment pipeline(s) 1610 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1612 and application orchestration system 1628. In at least one embodiment, so long as an expected input and/or output of each container or application is known by a system (e.g., based on constructs of applications or containers), application orchestration system 1628 and/or pipeline manager 1612 may facilitate communication among and between, and sharing of resources among and between, each of applications or containers. In at least one embodiment, because one or more of applications or containers in deployment pipeline(s) 1610 may share same services and resources, application orchestration system 1628 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1628) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1520 leveraged by and shared by applications or containers in deployment system 1506 may include compute services 1616, AI services 1618, visualization services 1620, and/or other service types. In at least one embodiment, applications may call (e.g., execute) one or more of services 1520 to perform processing operations for an application. In at least one embodiment, compute services 1616 may be leveraged by applications to perform super-computing or other high-performance computing (HPC) tasks. In at least one embodiment, compute service(s) 1616 may be leveraged to perform parallel processing (e.g., using a parallel computing platform 1630) for processing data through one or more of applications and/or one or more tasks of a single application, substantially simultaneously. In at least one embodiment, parallel computing platform 1630 (e.g., NVIDIA's CUDA) may enable general purpose computing on GPUs (GPGPU) (e.g., GPUs 1622). In at least one embodiment, a software layer of parallel computing platform 1630 may provide access to virtual instruction sets and parallel computational elements of GPUs, for execution of compute kernels. In at least one embodiment, parallel computing platform 1630 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1630 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1618 may be leveraged to perform inferencing services for executing machine learning model(s) associated with applications (e.g., tasked with performing one or more processing tasks of an application). In at least one embodiment, AI services 1618 may leverage AI system 1624 to execute machine learning model(s) (e.g., neural networks, such as CNNs) for segmentation, reconstruction, object detection, feature detection, classification, and/or other inferencing tasks. In at least one embodiment, applications of deployment pipeline(s) 1610 may use one or more of output models 1516 from training system 1504 and/or other models of applications to perform inference on imaging data. In at least one embodiment, two or more examples of inferencing using application orchestration system 1628 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1628 may distribute resources (e.g., services 1520 and/or hardware 1522) based on priority paths for different inferencing tasks of AI services 1618.

In at least one embodiment, shared storage may be mounted to AI services 1618 within system 1600. In at least one embodiment, shared storage may operate as a cache (or other storage device type) and may be used to process inference requests from applications. In at least one embodiment, when an inference request is submitted, a request may be received by a set of API instances of deployment system 1506, and one or more instances may be selected (e.g., for best fit, for load balancing, etc.) to process a request. In at least one embodiment, to process a request, a request may be entered into a database, a machine learning model may be located from model registry 1524 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1612) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1520 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1626, and an inference service may perform inferencing on a GPU.

In at least one embodiment, visualization services 1620 may be leveraged to generate visualizations for viewing outputs of applications and/or deployment pipeline(s) 1610. In at least one embodiment, GPUs 1622 may be leveraged by visualization services 1620 to generate visualizations. In at least one embodiment, rendering effects, such as ray-tracing, may be implemented by visualization services 1620 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1620 may include an internal visualizer, cinematics, and/or other rendering or image processing capabilities or functionality (e.g., ray tracing, rasterization, internal optics, etc.).

In at least one embodiment, hardware 1522 may include GPUs 1622, AI system 1624, cloud 1626, and/or any other hardware used for executing training system 1504 and/or deployment system 1506. In at least one embodiment, GPUs 1622 (e.g., NVIDIA's TESLA and/or QUADRO GPUs) may include any number of GPUs that may be used for executing processing tasks of compute services 1616, AI services 1618, visualization services 1620, other services, and/or any of features or functionality of software 1518. For example, with respect to AI services 1618, GPUs 1622 may be used to perform pre-processing on imaging data (or other data types used by machine learning models), post-processing on outputs of machine learning models, and/or to perform inferencing (e.g., to execute machine learning models). In at least one embodiment, cloud 1626, AI system 1624, and/or other components of system 1600 may use GPUs 1622. In at least one embodiment, cloud 1626 may include a GPU-optimized platform for deep learning tasks. In at least one embodiment, AI system 1624 may use GPUs, and cloud 1626— or at least a portion tasked with deep learning or inferencing—may be executed using one or more AI systems 1624. As such, although hardware 1522 is illustrated as discrete components, this is not intended to be limiting, and any components of hardware 1522 may be combined with, or leveraged by, any other components of hardware 1522.

In at least one embodiment, AI system 1624 may include a purpose-built computing system (e.g., a super-computer or an HPC) configured for inferencing, deep learning, machine learning, and/or other artificial intelligence tasks. In at least one embodiment, AI system 1624 (e.g., NVIDIA's DGX) may include GPU-optimized software (e.g., a software stack) that may be executed using a plurality of GPUs 1622, in addition to DPUs, CPUs, RAM, storage, and/or other components, features, or functionality. In at least one embodiment, one or more AI systems 1624 may be implemented in cloud 1626 (e.g., in a data center) for performing some or all of AI-based processing tasks of system 1600.

In at least one embodiment, cloud 1626 may include a GPU-accelerated infrastructure (e.g., NVIDIA's NGC) that may provide a GPU-optimized platform for executing processing tasks of system 1600. In at least one embodiment, cloud 1626 may include an AI system(s) 1624 for performing one or more of AI-based tasks of system 1600 (e.g., as a hardware abstraction and scaling platform). In at least one embodiment, cloud 1626 may integrate with application orchestration system 1628 leveraging multiple GPUs to enable seamless scaling and load balancing between and among applications and services 1520. In at least one embodiment, cloud 1626 may tasked with executing at least some of services 1520 of system 1600, including compute services 1616, AI services 1618, and/or visualization services 1620, as described herein. In at least one embodiment, cloud 1626 may perform small and large batch inference (e.g., executing NVIDIA's TENSOR RT), provide an accelerated parallel computing API and platform 1630 (e.g., NVIDIA's CUDA), execute application orchestration system 1628 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1600.

FIG. 17A illustrates a data flow diagram for a process 1700 to train, retrain, or update a machine learning model, in accordance with at least one embodiment. In at least one embodiment, process 1700 may be executed using, as a non-limiting example, system 1600 of FIG. 16. In at least one embodiment, process 1700 may leverage services 1520 and/or hardware 1522 of system 1600, as described herein. In at least one embodiment, refined models 1712 generated by process 1700 may be executed by deployment system 1506 for one or more containerized applications in deployment pipelines 1610.

In at least one embodiment, model training 1514 may include retraining or updating an initial model 1704 (e.g., a pre-trained model) using new training data (e.g., new input data, such as customer dataset 1706, and/or new ground truth data associated with input data). In at least one embodiment, to retrain, or update, initial model 1704, output or loss layer(s) of initial model 1704 may be reset, or deleted, and/or replaced with an updated or new output or loss layer(s). In at least one embodiment, initial model 1704 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1704, parameters may be updated and re-tuned for a new data set based on loss calculations associated with accuracy of output or loss layer(s) at generating predictions on new, customer dataset 1706 (e.g., image data 1508 of FIG. 15).

In at least one embodiment, pre-trained models 1606 may be stored in a data store, or registry (e.g., model registry 1524 of FIG. 15). In at least one embodiment, pre-trained models 1606 may have been trained, at least in part, at one or more facilities other than a facility executing process 1700. In at least one embodiment, to protect privacy and rights of patients, subjects, or clients of different facilities, pre-trained models 1606 may have been trained, on-premise, using customer or patient data generated on-premise. In at least one embodiment, pre-trained models 1606 may be trained using cloud 1626 and/or other hardware 1522, but confidential, privacy protected patient data may not be transferred to, used by, or accessible to any components of cloud 1626 (or other off premise hardware). In at least one embodiment, where a pre-trained model 1606 is trained at using patient data from more than one facility, pre-trained model 1606 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1606 on-premise and/or off premise, such as in a datacenter or other cloud computing infrastructure.

In at least one embodiment, when selecting applications for use in deployment pipelines 1610, a user may also select machine learning models to be used for specific applications. In at least one embodiment, a user may not have a model for use, so a user may select a pre-trained model 1606 to use with an application. In at least one embodiment, pre-trained model 1606 may not be optimized for generating accurate results on customer dataset 1706 of a facility of a user (e.g., based on patient diversity, demographics, types of medical imaging devices used, etc.). In at least one embodiment, prior to deploying pre-trained model 1606 into deployment pipeline 1610 for use with an application(s), pre-trained model 1606 may be updated, retrained, and/or fine-tuned for use at a respective facility.

In at least one embodiment, a user may select pre-trained model 1606 that is to be updated, retrained, and/or fine-tuned, and pre-trained model 1606 may be referred to as initial model 1704 for training system 1504 within process 1700. In at least one embodiment, customer dataset 1706 (e.g., imaging data, genomics data, sequencing data, or other data types generated by devices at a facility) may be used to perform model training 1514 (which may include, without limitation, transfer learning) on initial model 1704 to generate refined model 1712. In at least one embodiment, ground truth data corresponding to customer dataset 1706 may be generated by training system 1504. In at least one embodiment, ground truth data may be generated, at least in part, by clinicians, scientists, doctors, practitioners, at a facility (e.g., as labeled clinic data 1512 of FIG. 15).

In at least one embodiment, AI-assisted annotation 1510 may be used in some examples to generate ground truth data. In at least one embodiment, AI-assisted annotation 1510 (e.g., implemented using an AI-assisted annotation SDK) may leverage machine learning models (e.g., neural networks) to generate suggested or predicted ground truth data for a customer dataset. In at least one embodiment, user 1710 may use annotation tools within a user interface (a graphical user interface (GUI)) on computing device 1708.

In at least one embodiment, user 1710 may interact with a GUI via computing device 1708 to edit or fine-tune (auto)annotations. In at least one embodiment, a polygon editing feature may be used to move vertices of a polygon to more accurate or fine-tuned locations.

In at least one embodiment, once customer dataset 1706 has associated ground truth data, ground truth data (e.g., from AI-assisted annotation, manual labeling, etc.) may be used by during model training 1514 to generate refined model 1712. In at least one embodiment, customer dataset 1706 may be applied to initial model 1704 any number of times, and ground truth data may be used to update parameters of initial model 1704 until an acceptable level of accuracy is attained for refined model 1712. In at least one embodiment, once refined model 1712 is generated, refined model 1712 may be deployed within one or more deployment pipelines 1610 at a facility for performing one or more processing tasks with respect to medical imaging data.

In at least one embodiment, refined model 1712 may be uploaded to pre-trained models 1606 in model registry 1524 to be selected by another facility. In at least one embodiment, his process may be completed at any number of facilities such that refined model 1712 may be further refined on new datasets any number of times to generate a more universal model.

FIG. 17B is an example illustration of a client-server architecture 1732 to enhance annotation tools with pre-trained annotation models, in accordance with at least one embodiment. In at least one embodiment, AI-assisted annotation tools 1736 may be instantiated based on a client-server architecture 1732. In at least one embodiment, annotation tools 1736 in imaging applications may aid radiologists, for example, identify organs and abnormalities. In at least one embodiment, imaging applications may include software tools that help user 1710 to identify, as a non-limiting example, a few extreme points on a particular organ of interest in raw images 1734 (e.g., in a 3D MRI or CT scan) and receive auto-annotated results for all 2D slices of a particular organ. In at least one embodiment, results may be stored in a data store as training data 1738 and used as (for example and without limitation) ground truth data for training. In at least one embodiment, when computing device 1708 sends extreme points for AI-assisted annotation 1510, a deep learning model, for example, may receive this data as input and return inference results of a segmented organ or abnormality. In at least one embodiment, pre-instantiated annotation tools, such as AI-Assisted Annotation Tool 1736B in FIG. 17B, may be enhanced by making API calls (e.g., API Call 1744) to a server, such as an Annotation Assistant Server 1740 that may include a set of pre-trained models 1742 stored in an annotation model registry, for example. In at least one embodiment, an annotation model registry may store pre-trained models 1742 (e.g., machine learning models, such as deep learning models) that are pre-trained to perform AI-assisted annotation on a particular organ or abnormality. These models may be further updated by using training pipelines 1604. In at least one embodiment, pre-installed annotation tools may be improved over time as new labeled clinic data 1512 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    receiving, by an application hosting platform, an initial request for a compiled shader program for an application running at a first client device;
    determining, by the application hosting platform, whether the requested compiled shader program is stored at a shader cache associated with the application, the shader cache hosted by the application hosting platform;
    upon determining that the requested compiled shader program is not stored at the shader cache, receiving, from the first client device, the compiled shader program for the application;
    responsive to determining that the received compiled shader program is the same as a stored additional compiled shader program, updating a counter associated with the stored additional compiled shader program;
    responsive to determining that the updated counter associated with the stored additional compiled shader program satisfies a criterion, storing the received compiled shader program at the shader cache associated with the application;
    receiving a subsequent request for the compiled shader program for the application running at a second client device; and
    transmitting, to the second client device, a subsequent message comprising the compiled shader program.

2. The method of claim 1, further comprising:
    obtaining a first hash value associated with the first client device, wherein the first hash value is generated based on first state data for the first client device; and
    updating an entry of a shader cache data structure to include the first hash value with an indication of an address for a portion of the shader cache that stores the compiled shader program.

3. The method of claim 2, wherein the first state data comprises at least one of: an indication of a software state of the first client device or an indication of a hardware state of the first client device.

4. The method of claim 3, wherein the software state of the first client device comprises at least one of a driver state of the first client device or a source code for the received compiled shader program.

5. The method of claim 2, further comprising:
    responsive to receiving the subsequent request for the compiled shader program for the application running at the second client device, obtaining a second hash value associated with the second client device, wherein the second hash value is generated based on second state data for the second client device;
    determining that the second hash value matches the first hash value of the entry at the shader cache data structure; and
    retrieving the compiled shader program from the address of the portion of the shader cache indicated in the entry at the shader cache data structure.

6. The method of claim 1, wherein determining that the received compiled shader program is the same as an additional compiled shader program comprises:
    determining that the received compiled shader program is the same as the additional compiled shader program stored at a temporary buffer for the shader cache, and wherein determining that the updated counter associated with the stored additional compiled shader program satisfies a criterion comprises determining whether the updated counter associated with the additional compiled shader program exceeds a threshold value.

7. The method of claim 6, further comprising:
responsive to determining that the received compiled shader program is not the same as an additional compiled shader program stored at the temporary buffer, adding the received compiled shader program to the temporary buffer; and
initializing a counter associated with the received compiled shader program at the temporary buffer.

8. The method of claim 1, wherein the application hosting platform comprises a plurality of nodes configured to include a plurality of portions of the shader cache associated with the application, and wherein the initial request for the compiled shader program is received by a first node of the plurality of nodes.

9. The method of claim 8, further comprising:
determining that the compiled shader program of the initial request is not included at a first portion of the shader cache hosted by the first node of the plurality of nodes;
identifying a second node of the plurality of nodes that hosts a second portion of the shader cache which includes the compiled shader program of the initial request; and
forwarding the initial request to the identified second node.

10. The method of claim 1, further comprising:
responsive to determining that the requested compiled shader program is stored at the shader cache, transmitting the compiled shader program to the first client device.

11. The method of claim 1, wherein at least one of the first client device or the second client device comprises a virtual machine instantiated using a cloud computing environment.

12. The method of claim 1, further comprising:
obtaining a source code for an additional shader program associated with the application;
generating a compiled version of the additional shader program; and
storing the compiled version of the additional shader program at the shader cache associated with the application.

13. The method of claim 12, wherein the source code for the additional shader program is obtained responsive to determining that at least one of a hardware state or a software state of one or more of the first client device or the second client device has been modified from a first version to a second version, and wherein the compiled version of the additional shader program is compatible with the second version of the at least one of the hardware state or the software state.

14. A system comprising:
a memory device; and
one or more processing devices, communicatively coupled to the memory device, to:
detect that a shader program is referenced during a runtime of an application hosted by an application hosting platform;
determine whether the shader program is included in a set of shader programs that are not to be requested from the application hosting platform;
responsive to determining that the shader program is not included in the set of shader programs that are not to be requested from the application hosting platform, transmit an initial request to the application hosting platform for a compiled version of the shader program from a shader cache associated with the application, the shader cache hosted by the application hosting platform;
receive a message from the application hosting platform in response to the initial request; determine whether the received message includes the compiled version of the shader program from the shader cache;
responsive to determining that the received message does not include the compiled version of the shader program from the shader cache, compile the shader program to generate the compiled version of the shader program; and
transmit, to the application hosting platform, a subsequent request to store the compiled version of the shader program at the shader cache associated with the application.

15. The system of claim 14, wherein the one or more processing devices are further to:
responsive to determining that the received message includes the compiled version of the shader program from the shader cache, store the compiled version of the shader program at the memory device; and
execute the compiled version of the shader program.

16. The system of claim 14, wherein the one or more processing devices are further to:
responsive to transmitting the initial request to the application hosting platform for the compiled version of the shader program from the shader cache, initiate a compilation operation to compile the shader program to generate the compiled version of the shader program;
determine that the compilation operation is completed before the message is received from the application hosting platform in response to the initial request;
transmit an additional request to the application hosting platform to cancel the initial request for the compiled version of the shader program from the shader cache; and
execute the compiled version of the shader program that is generated during the performance of the compilation operation.

17. The system of claim 16, wherein the one or more processing devices are further to:
receive the message from the application hosting platform in response to the initial request before the compilation operation is completed;
generate an instruction to terminate the compilation operation; and
execute the compiled version of the shader program that is included in the received message from the application hosting platform.

18. The system of claim 14, wherein the one or more processing devices are further to:
receive, during an initialization of the application, an indication of the set of shader programs that are not to be requested from the application hosting platform; and
responsive to determining that the shader program referenced during the runtime of the application is included in the set of shader programs, compile the shader program to generate the compiled version of the shader program.

19. The system of claim 14, wherein the initial request transmitted to the application hosting platform comprises one or more hash values generated based on at least one of state data for the system or a source code for the shader program, the state data comprising at least one of a software state for the system or a hardware state of the system.

20. The system of claim 14, wherein the one or more processing devices are further to:

store a copy of the compiled version of the shader program at the memory device;

detect that the application hosted by the application hosting platform is terminated; and erase the copy of the compiled version of the shader program from the memory device.

21. The system of claim 14, wherein the system further comprises a virtual machine instantiated using a cloud computing environment.

22. A non-transitory computer-readable medium storing instructions thereon, wherein the instructions, when executed by a processing device, cause the processing device to:

receive an initial request for a compiled shader program for an application running at a first client device;

determine whether the requested compiled shader program is stored at a shader cache associated with the application, the shader cache hosted by an application hosting platform;

upon determining that the requested compiled shader program is not stored at the shader cache, receive, from the first client device, the compiled shader program for the application;

responsive to determining that the received compiled shader program is the same as a stored additional compiled shader program, updating a counter associated with the stored additional compiled shader program;

responsive to determining that the updated counter associated with the stored additional compiled shader program satisfies a criterion, store the received compiled shader program at the shader cache associated with the application;

receive a subsequent request for the compiled shader program for the application running at a second client device; and transmit, to the second client device, a subsequent message comprising the compiled shader program.

* * * * *